United States Patent
Flordal et al.

(10) Patent No.: US 10,824,357 B2
(45) Date of Patent: Nov. 3, 2020

(54) UPDATING DATA STORED IN A MEMORY

(71) Applicant: Arm Limited, Cambridge (GB)

(72) Inventors: Lars Oskar Flordal, Uppsala (SE);
Jian Wang, Skane (SE); Jakob Axel Fries, Malmo (SE)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 15/798,060

(22) Filed: Oct. 30, 2017

(65) Prior Publication Data

US 2018/0129419 A1 May 10, 2018

(30) Foreign Application Priority Data

Nov. 7, 2016 (GB) .................................. 1618728.8

(51) Int. Cl.
*G06F 3/06* (2006.01)
*G06T 1/60* (2006.01)

(52) U.S. Cl.
CPC ............ *G06F 3/064* (2013.01); *G06F 3/0614* (2013.01); *G06F 3/0656* (2013.01); *G06F 3/0683* (2013.01); *G06T 1/60* (2013.01)

(58) Field of Classification Search
CPC ...... G06F 3/064; G06F 3/0614; G06F 3/0683; G06F 3/0656; G06T 1/60
See application file for complete search history.

(56) References Cited

U.S. PATENT DOCUMENTS

| | | | |
|---|---|---|---|
| 2003/0028695 A1 | 2/2003 | Burns | |
| 2008/0266302 A1* | 10/2008 | Andre | ................ G06F 13/4234 345/519 |
| 2010/0199106 A1 | 8/2010 | Iida | |
| 2013/0034309 A1 | 2/2013 | Nystad | |

(Continued)

FOREIGN PATENT DOCUMENTS

| | | | |
|---|---|---|---|
| GB | 2522512 A | 7/2015 | |
| JP | 2011-250151 | * 12/2011 | ............... H04N 1/21 |
| JP | 2011-250151 A1 | 12/2011 | |

OTHER PUBLICATIONS

Combined Search and Examination Report dated May 31, 2017, GB Patent Application No. GB1618728.8.

(Continued)

*Primary Examiner* — Maurice L. McDowell, Jr.
*Assistant Examiner* — Donna J. Ricks
(74) *Attorney, Agent, or Firm* — Vierra Magen Marcus LLP

(57) ABSTRACT

A process of updating data for a block of an array of data elements stored in an allocated memory region for the block comprises reading in data for a first group of the data elements, updating the data for the first group, and then writing back the updated data to memory. The process can avoid overwriting data for a second group of the data elements that is yet to be read in from the memory region by writing back the updated data for the first group starting at a selected memory address, for example other than the start address of the memory region. The data for the second group (Continued)

of data elements can then be read in and updated, and the updated data can be written back to memory. The process can reduce the amount of memory bandwidth and local cache that needs to be used.

16 Claims, 12 Drawing Sheets

(56) References Cited

U.S. PATENT DOCUMENTS

2013/0195352 A1    8/2013   Nystad
2016/0127598 A1*   5/2016   Yaguchi ............... H04N 1/2112
                                                             348/231.99

OTHER PUBLICATIONS

GB Examination Report dated Aug. 27, 2019, GB Patent Application No. GB1618728.8.

* cited by examiner

UPDATING DATA STORED IN A MEMORY

BACKGROUND

The technology described herein relates to a method of and apparatus for updating data for a block of data elements of an array of data elements stored in memory.

It is common for data processing apparatus to read in data for an array of data elements (e.g. a frame or graphics texture) from memory, perform data processing using the data so as to generate updated data for the array (e.g. such as a subsequent frame or updated graphics texture), and write back the updated data for the array to the same memory. The updated data may then be read out from the memory (e.g. for display or for further use as an updated graphics texture). As part of this process, it is also common to encode the data to be stored in memory, for example so as to compress the data in order to reduce bandwidth and memory consumption. This is particularly desirable in data processing apparatus, e.g. of portable devices, where processing resources and processing power may be limited.

Arrays of data elements are often divided into smaller blocks of data elements (e.g. so called "tiles") and then processed on a block by block basis. This processing based on smaller blocks of data elements can allow, for example, parallel processing of the data elements of the array. This is particularly desirable in data processing apparatus, e.g. having plural data processing cores, where higher processing performance is sought. This processing based on smaller blocks of data elements can also allow, for example, partial updating of, or random access to, the blocks of the array, i.e. without needing process the entire array each time data for the array needs to be updated or accessed. This in turn can reduce the amount of memory bandwidth and local cache that needs to be used to update or access part of the array of data elements. This is particularly beneficial, for example, in graphics processing apparatus where partial updating of a frame or random access into a graphics texture is often desired.

In some arrangements, the processing of the data for a block of data elements may result in updated data for the block that is of a different (e.g. larger) data size than the original data for that block. This is particularly this case where the updated data for the block comprises encoded data. For example, data for blocks of substantially uniform data values (e.g. substantially uniform appearance or colour) tends to compress well, whereas data for blocks of highly varied data values tends not to compress so well. Thus, the size of the updated data for a block of data elements may change (e.g. increase) as a result of the data processing performed on the data for that block. This can mean that the data for a block of data elements does not occupy a consistent amount of memory.

The Applicants believe that there remains scope for improved arrangements for updating data for a block of data elements of an array of data elements stored in memory.

BRIEF DESCRIPTION OF THE DRAWINGS

Various embodiments of the technology described herein will now be described by way of example only and with reference to the accompanying drawings, in which.

Figure 1:
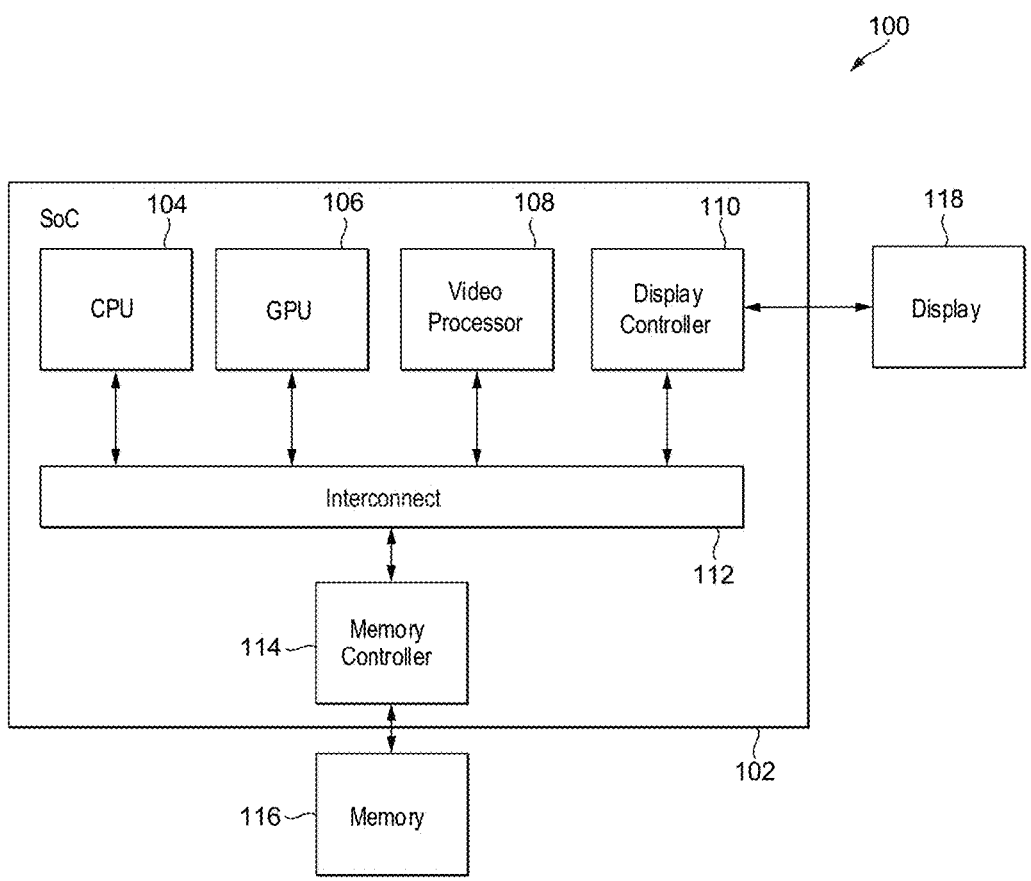
FIG. 1 shows schematically a data processing system according to an embodiment of the technology described herein.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of updating data for a block of data elements of an array of data elements stored in memory, the data for the block of data elements being stored within the memory in a memory region allocated to the block, the method comprising:

reading in data for a first group of data elements of the block of data elements from the memory region;

performing a data processing operation using the data for the first group of data elements to generate updated data for the first group of data elements;

writing back the updated data for the first group of data elements to the memory starting at a selected memory address such that data for a second group of data elements of the block of data elements that is yet to be read in from the memory region is not overwritten by the updated data for the first group of data elements being written back to the memory;

reading in the data for the second group of data elements from the memory region;

performing a data processing operation using the data for the second group of data elements to generate updated data for the second group of data elements; and writing back the updated data for the second group of data elements to the memory without overwriting the updated data for the first group of data elements.

Another embodiment of the technology described herein comprises a data processing apparatus for updating data for a block of data elements of an array of data elements stored in a memory, the data for the block of data elements being stored within the memory in a memory region allocated to the block, the data processing apparatus comprising processing circuitry configured to:

read in data for a first group of data elements of the block of data elements from the memory region;

perform a data processing operation using the data for the first group of data elements to generate updated data for the first group of data elements;

write back the updated data for the first group of data elements to the memory starting at a selected memory address such that data for a second group of data elements of the block of data elements that is yet to be read in from the memory region is not overwritten by the updated data for the first group of data elements being written back to the memory;

read in the data for the second group of data elements from the memory region;

perform a data processing operation using the data for the second group of data elements to generate updated data for the second group of data elements; and write back the updated data for the second group of data elements to the memory without overwriting the updated data for the first group of data elements.

Another embodiment of the technology described herein comprises a data processing system comprising:

a memory configured to store data for a block of data elements of an array of data elements, the data for the block of data elements being stored within the memory in a memory region allocated to the block; and a data processing apparatus comprising processing circuitry configured to:

read in data for a first group of data elements of the block of data elements from the memory region;

perform a data processing operation using the data for the first group of data elements to generate updated data for the first group of data elements;

write back the updated data for the first group of data elements to the memory starting at a selected memory address such that data for a second group of data elements of the block of data elements that is yet to be read in from the memory region is not overwritten by the updated data for the first group of data elements being written back to the memory;

read in the data for the second group of data elements from the memory region;

perform a data processing operation using the data for the second group of data elements to generate updated data for the second group of data elements; and write back the updated data for the second group of data elements to the memory without overwriting the updated data for the first group of data elements.

Thus, in embodiments of the technology described herein, when the data for a block of data elements (e.g. for a tile) of an array of data elements (e.g. of a frame or graphics texture) is to be updated, data for a first group of the data elements of the block (e.g. a first group comprising some, but not all, of the data elements of the block) is read in from a memory region allocated to (reserved for) that block. A data processing operation is then performed using the data for the first group of data elements to generate updated data for the first group of data elements, and the updated data for the first group of data elements is written back to the memory before data for a second group of data elements of the block (e.g. a second different group comprising some, but not all, of the data elements of the block) is read in from the memory region. Thus, the data for the second group of data elements does not, e.g., need to be read in and locally cached etc., together with the data for the first group of data elements. This can significantly reduce the amount of processing resources, e.g., memory bandwidth and local cache, etc., that needs to be used at any one time when updating data for a block of data elements of an array of data elements.

Furthermore, in embodiments of the technology described herein, the updated data for the first group of data elements is written back to the memory starting at a selected memory address such that data for the second group of the data elements of the block that is yet to be read in from the memory region is not (and, e.g., cannot be) overwritten by the updated data for the first group of data elements being written back to the memory. For example, overwriting of the data for the second group of data elements may be avoided by writing back the updated data for the first group of data elements to the memory starting at a selected memory address other than the start address of the memory region (which is the address within a memory region allocated to a block at which the original data for that block is typically stored). Thus, in embodiments of the technology described herein, the data for the second group of the data elements of the block is still available in the memory region for use when updating the data for the second group of data elements (e.g. when updating some or all of the remaining data for the block).

In a first set of embodiments, the data for the first group of data elements (which may be encoded (e.g. compressed)) may be read in from the memory region and a data processing operation may be performed using the data for the first group of data elements to generate the updated data for the first group of data elements. The updated data for the first group of data elements (which may be encoded (e.g. compressed) or unencoded (e.g. uncompressed)) may then be written back to the same memory region starting from the end of the (original) data for the block that is currently stored in the memory region. The data for the second group of data elements (which may be encoded (e.g. compressed)) may then be read in from the memory region and a data processing operation may then be performed using the data for the second group of data elements to generate the updated data for the second group of data elements. The updated data for the second group of data elements (which may be encoded (e.g. compressed) or unencoded (e.g. uncompressed)) may then be written back to the same memory region starting from the end of the updated data for the first group of data elements. The processes performed in respect of the second group of data elements may then be repeated in respect of one or more other groups of data elements of the block (which may be encoded (e.g. compressed)), with the updated data for the current group (which may be encoded (e.g. compressed) or unencoded (e.g. uncompressed)) being written back to the same memory region starting from the end of the updated data for the previous group of data elements to be updated. In these embodiments, writing back the updated data for a group of data elements to memory may comprise writing back the updated data up to the end of the memory region and, when the end of the memory region is reached, returning to the start address of the memory region and continuing to write the updated data from there onwards. In these embodiments, the memory region may have a fixed data size (e.g. in bits or bytes). The fixed data size (e.g. in bits or bytes) of the memory region may be substantially equal to the data size (e.g. in bits or bytes) that the data for the block can have when unencoded (e.g. uncompressed).

In a second set of embodiments, the data for the first group of data elements (which may be encoded (e.g. compressed)) may be read in from the memory region and a data processing operation may be performed using the data for the first group of data elements to generate the updated data for the first group of data elements. The updated data for the first group of data elements (which may be encoded (e.g. compressed) or unencoded (e.g. uncompressed)) may then be written back to the same memory region starting at the start of a memory portion within the memory region that is allocated to the first group of data elements. The memory portion that is allocated to the first group of data elements may be the last memory portion of plural memory portions into which the memory region is divided. The data for the second group of data elements (which may be encoded (e.g. compressed)) may then be read in from the memory region and a data processing operation may then be performed using the data for the second group of data elements to generate the updated data for the second group of data elements. The updated data for the second group of data elements (which may be unencoded (e.g. uncompressed)) may then be written back to the same memory region starting at the start of a memory portion within the memory region that is allocated to the second group of data elements. The memory portion that is allocated to the second group of data elements may be the next to last memory portion of the plural memory portions into which the memory region is divided. The processes performed in respect of the second group of data elements may then be repeated in respect of one or more other groups of data elements of the block (which may be encoded (e.g. compressed)), with the updated data for the current group (which may be unencoded (e.g. uncompressed)) being written back to the same memory region starting at the start of a memory portion within the memory region that is allocated to that current group. In these embodiments, the memory region may have a fixed data size (e.g. in bits or bytes). The fixed data size (e.g. in bits or bytes) of the memory region may again be substantially equal to the data size (e.g. in bits or bytes) that the data for the block can have when unencoded (e.g. uncompressed). In these embodiments, the data sizes (e.g. in bits or bytes) of the respective memory portions may be substantially equal to the data sizes (e.g. in bits or bytes) that the data for the respective groups can have when unencoded (e.g. uncompressed).

In a third set of embodiments, the data for the first group of data elements (which may be encoded (e.g. compressed)) may be read in from the memory region and a data processing operation may be performed using the data for the first group of data elements to generate the updated data for the first group of data elements. The updated data for the first group of data elements (which may be encoded (e.g. compressed) or unencoded (e.g. uncompressed)) may then be written back to a different memory region that is allocated to the block to the memory region from which the data for the first group of data elements was read in. The data for the second group of data elements (which may be encoded (e.g. compressed)) may then be read in from the memory region from which the data for the first group of data elements was read in and a data processing operation may then be performed using the data for the second group of data elements to generate the updated data for the second group of data elements. The updated data for the second group of data elements (which may be encoded (e.g. compressed) or unencoded (e.g. uncompressed)) may then be written back to the different memory region starting from the end of the updated data for the first group of data elements. The processes performed in respect of the second group of data elements may then be repeated in respect of one or more other groups of data elements of the block (which may be encoded (e.g. compressed)), with the updated data for the current group (which may be encoded (e.g. compressed) or unencoded (e.g. uncompressed)) being written back to the different memory region starting at the end of the updated data for the previous group of data elements to be updated. In these embodiments, the block may be one of a set of plural blocks of data elements of the array of data elements. In these embodiments, once the groups of data elements for the block of data elements have been read in, updated and written back to the different memory region, the original memory region may be marked for reuse, e.g. when storing/updating data for another block of the array. In these embodiments, there may be a set of plural memory regions reserved for storing/updating the respective data sets for the plural blocks of the array. The number of memory regions in the set of plural memory regions may be greater than the number of blocks in the set of blocks but less than double the number of blocks in the set of blocks. In these embodiments, the respective memory regions may have fixed data sizes (e.g. in bits or bytes). The fixed data sizes (e.g. in bits or bytes) of the respective memory regions may again be substantially equal to the data size (e.g. in bits or bytes) that the data for the block can have when unencoded (e.g. uncompressed). Alternatively, the respective memory regions may have variable data sizes (e.g. in bits or bytes) that vary with and depend on the data size (e.g. in bits or bytes) of the data for the block stored therein. The variable data sizes (e.g. in bits or bytes) of the respective memory regions may be less than or equal to the data size (e.g. in bits or bytes) that the data for the block can have when unencoded (e.g. uncompressed).

In any of the embodiments disclosed herein, where there is data for one or more other groups of data elements of the block (e.g. one or more other different groups comprising some, but not all, of the data elements of the block) yet to be updated, writing back the updated data for the first and second groups of data elements to the memory may be performed such that the data for the one or more other groups of data elements that is yet to be read in from the memory region is not overwritten by the updated data for the first and second groups of data elements that is being written back to the memory. Thus, in these embodiments, the data for the one or more other groups of data elements does not, e.g., need to be read in and locally cached, etc., together with the data for the first and second groups of data elements. This again can significantly reduce the amount of processing resources, e.g., memory bandwidth and local cache, etc., that needs to be used at any one time when updating the data for a block of data elements.

Furthermore, in these embodiments, the data for the one or more other groups the data elements of the block is still available in the memory region for use when updating the data for those one or more other groups of data elements (e.g. when updating some or all of the remaining data for the block). The data processing apparatus can then read in the data for the one or more other groups of data elements from the memory region, perform a data processing operation using the data for the one or more other groups of data elements to generate updated data for the one or more other groups of data elements, and write back the updated data for the one or more other groups of data elements to the memory without overwriting the updated data for the first and second groups of data elements.

Thus, embodiments may comprise performing, in respect of each particular one of plural different groups of data elements of a block of data elements of an array of data elements, a process comprising: reading in data for the particular group of data elements from a memory region allocated to (reserved for) the block of data elements; performing a data processing operation using the data for the particular group of data elements to generate updated data for the particular group of data elements; and writing back the updated data for the particular group of data elements to the memory starting at a selected memory address such that data for one or more other groups of data elements of the block that is yet to be read in from the memory region is not overwritten by the updated data for the particular group of data elements being written back to the memory and/or such that updated data that is already generated for one or more other groups of data elements of the block of data elements is not overwritten by the updated data for the particular group of data elements being written back to the memory.

In some embodiments, the updated data for the block of data elements may be further updated, e.g. in respect of each array (frame or graphics texture) update of a sequence of plural array updates. Thus, in embodiments in which one or more further array updates are performed, the expression "data" used herein to describe the initial update may, where appropriate, be replaced with the expression "updated data" and the expression "updated" used herein to describe the initial update may, where appropriate, be replaced with the expression "further updated", etc.

For example, embodiments may further comprise performing, in respect of each particular one of plural different groups of data elements of a block of data elements of an array of data elements, a process comprising: reading in updated data for the particular group of data elements from a memory region allocated to (reserved for) the block of data elements; performing a data processing operation using the updated data for the particular group of data elements to generate further updated data for the particular group of data elements; and writing back the further updated data for the particular group of data elements to the memory starting at a selected memory address such that updated data for one or more other groups of data elements of the block that is yet to be read in from the memory region is not overwritten by the further updated data for the particular group of data elements being written back to the memory and/or such that further updated data that is already generated for one or more other groups of data elements of the block of data elements is not overwritten by the further updated data for the particular group of data elements being written back to the memory.

In some embodiments, a similar approach may be taken when further updating the data for the block of data elements to that which was taken when initially or previously updating the data for the block of data elements. In other embodiments, a different approach may be taken when further updating the data for the block of data elements to that which was taken when initially or previously updating the data for the block of data elements. For example, as will be described in more detail below, embodiments may comprise alternating between different update approaches, e.g. for a sequence of plural array (e.g. frame or graphics texture) updates. For example, as will also be discussed in more detail below, the different update approaches may differ in the order in which the respective data sets for the groups is read in, updated, and written back to memory (e.g. alternating between a forward order and a reverse order) and/or may differ in the direction in which the updated data is written back (e.g. alternating between writing backwards (to decreasing memory addresses) and forwards (to increasing memory addresses)) and/or may differ in the type of data which is read in from memory (e.g. alternating between data that comprises encoded (e.g. compressed) data and data that comprises at least some unencoded (e.g. uncompressed) data) and/or may differ in the type of updated data which is written back to memory (e.g. alternating between updated data that comprises at least some unencoded (e.g. uncompressed) data and updated data that comprises encoded (e.g. compressed) data).

In embodiments, the array of data elements referred to herein may take any desired and suitable form. The array of data elements may, for example, correspond to an array of data positions. The array of data elements or positions may correspond to all or part of a desired (e.g. graphics or image) output, such as a frame (e.g. for display) or graphics texture. There may be any desired and suitable correspondence between the data elements or positions and the desired output. Thus, the data elements or positions of the array may each correspond to a pixel/texel or pixels/texels of a desired output. The array of data elements can be any desired and suitable size or shape in terms of data elements or positions, such as rectangular (including square). For example, the array of data elements may be at least 32×32 data elements or positions in size, although the array could be smaller or much larger than this in terms of data elements.

In embodiments, the block of data elements referred to herein may take any desired and suitable form. In embodiments, the block of data elements can be any desired and suitable size or shape in terms of data elements or positions, such as rectangular (including square). For example, the blocks of data elements may be at least 256 (e.g. 32×8 or 16×16), etc., data elements or positions in size. In embodiments, the block of data elements may be one of plural blocks of data elements that the array of data elements is divided into, for example for data processing (e.g. rendering and/or encoding/decoding) purposes. For example, the block of data elements may be one of plural so called "tiles", for example that a data processing operation (e.g. rendering and/or encoding/decoding operation) can be performed on separately. The plural blocks of data elements may be non-overlapping and/or may be similar or different in size or shape. The array of data elements can be any desired and suitable size, shape or configuration in terms of such blocks. For example, the array of data elements may be at least 4 (e.g. 1×4 or 2×2), etc., blocks of data elements in size, although the array could be smaller or much larger than this in terms of blocks of data elements.

In embodiments, the groups of data elements referred to herein may be any desired and suitable grouping of the data elements of the block. In embodiments, the groups of data elements can be any desired and suitable size or shape in terms of data elements or positions, such as rectangular (including square). For example, the groups of data elements may be at least 128 (e.g. 16×8), 64 (e.g. 8×8), etc., data elements or positions in size. The groups of data elements may be non-overlapping and/or may be similar or different in size or shape. The block of data elements can be any desired and suitable size, shape or configuration in terms of such groups. For example, the block of data elements may be at least 2 (e.g. 2×1 or 1×2), 4 (4×1 or 2×2), etc., groups of data elements in size.

In embodiments, the block of data elements may be further divided into plural subblocks of data elements for processing (e.g. encoding/decoding) purposes. The subblocks of data elements referred to herein may take any desired and suitable form. In embodiments, the subblocks of data elements can be any desired and suitable size or shape in terms of data elements or positions, such as rectangular (including square). For example, the subblocks of data elements may be 16 (e.g. 4×4) data elements or positions in size. The subblocks of data elements may be non-overlapping and/or may be similar or different in size or shape. The block of data elements can be any desired and suitable size, shape or configuration in terms of such subblocks. For example, the block of data elements may be at least 16 (e.g. 8×2 or 4×4) subblocks of data elements in size. Similarly, the groups of data elements can be any desired and suitable size, shape or configuration in terms of such subblocks. For example, the groups of data elements may be at least 8 (e.g. 4×2), 4 (2×2), etc., subblocks of data elements in size.

In embodiments, the (original) data for the groups of data elements may be provided in any desired and suitable way. For example, embodiments may comprise generating (at least some or all of) the data for the groups of data elements. Thus, the apparatus may comprise data processing circuitry configured to generate (at least some or all of) the data for the groups of data elements. Embodiments may also or instead comprise importing (at least some or all of) the data for the groups of data elements, e.g. from an external source.

The data elements themselves may have any desired and suitable format, for example that represents graphics or image data values (e.g. colour, transparency, etc., values). For example, the format may represent a single (e.g. graphics or image) data value (e.g. R, G, B, Y, U, V, α, etc.). Alternatively, the format may represent plural (e.g. graphics or image) data values (e.g. RGB, RGBα, YUV, YUVα, etc.). The format may, for example, comprise 8 bits per data value. The format may, for example, comprise 32 bits per data element. The format may be, for example, RGBA8.

In embodiments, the (original or updated) data for the groups of data elements may also have any desired and suitable format that represents the data elements of the groups. The data for the groups of data elements may, for example, comprise encoded (e.g. compressed) data for one or more groups of the groups and/or unencoded (e.g. uncompressed) data for one or more other groups of the groups.

For example, in some embodiments, the data for one or more or all of the groups of data elements (e.g. the first group at least) read in from the memory and the corresponding updated data for one or more or all of the groups of data elements (e.g. the first group at least) written back to the memory may comprise encoded (e.g. compressed) data. In these embodiments, the data processing apparatus may be configured to decode (e.g. decompress) the data for one or more or all of the groups of data elements (e.g. the first group at least) that is read in from memory and/or may be configured to encode (e.g. compress) the updated data for one or more or all of the groups of data elements (e.g. the first group at least) that is written back to memory.

As will be appreciated, depending on the relative degree of encoding (e.g. compression) achieved, the updated data written back to the memory may turn out to be larger in data size (e.g. bits or bytes) than the corresponding data read in from the memory. Indeed, the technology described herein is particularly useful in circumstances where the updated data written back to the memory turns out to be larger in data size (e.g. bits or bytes) than the corresponding data read in from the memory, such that unwanted overwriting would probably have occurred when using a conventional approach instead.

In embodiments, the data for one or more or all of the groups of data elements read in from the memory may comprise encoded (e.g. compressed) data and the corresponding updated data for one or more or all of the groups of data elements (e.g. the second and/or any subsequent groups of data elements) written back to the memory may comprise unencoded (e.g. uncompressed) data. In these embodiments, the data processing apparatus may be configured to decode (e.g. decompress) the data for one or more or all of the groups of data elements that is read in from memory and/or may be configured not to encode (e.g. compress) the updated data for one or more or all of the groups of data elements (e.g. the second and/or any subsequent groups of data elements) that is written back to memory.

As will be appreciated, in these other embodiments, the updated data written back to the memory will generally be larger in data size (e.g. bits or bytes) than the corresponding data read in from the memory. As discussed above, the technology described herein is particularly useful in these circumstances where the updated data written back to the memory turns out to be larger in data size (e.g. bits or bytes) than the corresponding data read in from the memory, such that unwanted overwriting would probably have occurred when using a conventional approach instead.

As indicated above, in embodiments, the updated data for one or more or all of the groups of data elements (e.g. the second and/or any subsequent groups of data elements) may alternate between comprising unencoded (e.g. uncompressed) data and encoded (e.g. compressed) data, e.g. for a sequence of plural array (frame or texture) updates.

The encoding scheme used to encode the data for the groups of data elements can take any desired and suitable form. The encoding scheme may, for example, comprise compression and/or encryption of the data for the groups of data elements. In embodiments, the encoding scheme may provide encoded data of non-fixed data size. For the purposes of the present disclosure, an encoding scheme that provides encoded data of non-fixed data size is an encoding scheme for which, for plural sets (e.g. groups) of data elements having the same size (e.g. in terms of number of data elements) but having different data content (e.g. in terms of data values for the data elements), the data size of the encoded data for those sets (e.g. in terms of bits or bytes) that is provided when using that encoding scheme is not the same. In embodiments, the encoding scheme used to encode the groups of data elements may comprise an entropy encoding scheme or difference encoding scheme.

The decoding scheme used to decode the encoded data for the groups of data elements can also take any desired and suitable form, for example that corresponds to (e.g. is the inverse of) the encoding scheme used to encode the data for the groups of data elements.

In embodiments, the memory region allocated for the block may have a fixed data size. This use of an allocated memory region of fixed data size can provide predicable memory usage and can therefore help to avoid unwanted overwriting of data. In these embodiments, the fixed data size (e.g. in bits or bytes) of the memory region may be at least the data size (e.g. in bits or bytes) that the data for the block can have when unencoded (e.g. uncompressed). This can allow the memory region to store the data for the block in a worst case scenario, e.g. when little or no compression is achieved or desired. The fixed data size (e.g. in bits or bytes) of the memory region may be less than double, e.g. substantially equal to, the data size (e.g. in bits or bytes) that the data for the block can have when unencoded (e.g. uncompressed). This can significantly reduce the amount of memory used when storing/updating the block, whilst still allowing the memory region to store the data for the block in a worst case scenario, e.g. when little or no compression is achieved or desired.

In other embodiments, the memory region allocated for the block may have a variable data size (e.g. in bits or bytes) that varies with and depends on the data size (e.g. in bits or bytes) of the data for the block stored therein. In these embodiments, the variable data size (e.g. in bits or bytes) of the memory region may be less than or equal to the data size (e.g. in bits or bytes) that the data for the block can have when unencoded (e.g. uncompressed).

As will be appreciated, the unencoded (e.g. uncompressed) data size (e.g. in bits or bytes) of the data for the block is dependent both on the block size in terms of data elements and the particular format used for the unencoded (e.g. uncompressed) data elements of the block. For example, for a block that is 256 (e.g. 32×8 or 16×16) data elements in size and that has 32 bits per data element, the unencoded (e.g. uncompressed) data size of the data for the block of data elements (and thus, in embodiments, the fixed data size for the memory region for the block) may be 1024 bytes (i.e. [256×32]/8).

In any of the embodiments, reading in the data for the block of data elements may comprise reading in a header for the block of data elements from memory. The header may be one of plural stored headers that respectively indicate a memory region in the memory at which the data for a block of data elements is stored in memory. The header may thus be used to determine the memory region in the memory in which the data for the block of data elements is stored. The data for the block of data elements may then be read in from memory from the memory region indicated by the header. Thus, the data for the block of data elements may be stored in memory in a memory region indicated in a header for the block. The indication may take any desired and suitable form, such as an address in memory or a memory offset (e.g. from the start of a buffer, such as a header buffer that stores the header). The header for the block may also indicate data sizes (e.g. in bits or bytes) and/or locations (e.g. addresses or offsets in bits or bytes) for the respective groups and/or subblocks of the groups in the memory region in question. The data sizes and/or locations for the respective groups and/or subblocks of the groups may, for example, allow the data for a particular group and/or for the subblocks of a particular group to be located for the purposes of reading in the data for that particular group from the memory region in question. The header for the block may also indicate the direction (e.g. backwards (i.e. in the direction of decreasing memory addresses) or forwards (i.e. in the direction of increasing memory addresses)) in which the data for the block, respective groups and/or subblocks of the groups is stored.

In embodiments, the data processing operation referred to herein may comprise any desired and suitable data processing operation, such as a graphics processing operation or image processing operation. The data processing operation may comprise, for example, one or more of: decoding (e.g. decompressing), encoding (e.g. compressing), rendering, blending, shading, texture mapping, filtering, rotating, scaling, translating, etc. The data processing operation may use any other desired and suitable data in addition to the data for the group of data elements in question.

The data for the groups of data elements may be processed (e.g. initially generated or updated using the data processing operation) in any desired and suitable way. For example, processing (e.g. generating or updating) the data for the groups of data elements may comprise a rendering process (e.g. rasterising primitives to generate graphics fragments and/or rendering graphics fragments). A graphics processing pipeline may be used in order to process (e.g. generate or update) the data for the groups of data elements. The graphics processing pipeline may contain any suitable and desired processing stages that graphics pipeline may contain, such as a vertex shader, a rasterisation stage, a rendering stage, texture mapper, etc., in order to process (e.g. generate or update) the data for the groups of data elements.

The order or sequence in which the respective data sets for the groups of data elements of the block are arranged in memory in terms of increasing memory address (the "arrangement" order) can be any desired and suitable order with respect to the way in which the respective groups of data elements make up the block of data elements. The arrangement order may be, for example, raster order, Morton or Z order, U order, etc. with respect to the way in which the respective groups of data elements make up the block of data elements.

Similarly, the order or sequence in which the respective data sets for the groups of data elements of the block are read in from the memory region, updated and written back to the memory (the "update" order) can be any desired and suitable order.

In some embodiments, the update order may be the same as (may follow) the arrangement order. For example, the data for the first group of data elements to be read in from the memory region, updated and written back to the memory may be arranged first in sequence in the memory, the data for the second group of data elements to be read in from the memory region, updated and written back to the memory may be arranged second in sequence (e.g. arranged (directly) after the data for the first group of data elements) in the memory, and so on.

In some embodiments, the data for the first group of data elements to be read in from the memory region, updated and written back to the memory may, when written back, be written (directly) after the (original) data for the block. In some embodiments, the data for the second group of data elements to be read in from the memory region, updated and written back to the memory may, when written back, be written (directly) after the updated data for the first group, and so on. This can help to avoid overwriting the data for groups of data elements that is yet to be read in from memory.

In some embodiments, writing back the updated data for a group of data elements to memory may comprise writing back the updated data up to the end of the memory region and, when the end of the memory region is reached, returning to the start address of the memory region and continuing to write the updated data from there onwards. Thus, the memory region may be used in the manner of a "ring buffer". Again, this can help to avoid overwriting the data for groups of data elements that are yet to be read in from the memory region, whilst making good (e.g. contiguous) use of a memory region, e.g. that is of fixed data size.

In some embodiments, if/when the (previously) updated data for the block is further updated, the further update order may again be the same as (may again follow) the arrangement order. In these embodiments, the (previously) updated data for the first group of data elements to be read in from the memory region, further updated and written back to the memory may again be written (directly) after the (previously) updated data for the block. Again, this can help to avoid overwriting the (previously) updated data for groups of data elements that are yet to be read in from memory.

In other embodiments, the update order may be the reverse of (may run counter to) the arrangement order. For example, the data for the group located last in sequence in the memory region may be the data for the first group of data elements to be read in from the memory region, updated and written back to the memory, the data for the group located next to last in sequence (e.g. located (directly) before the data for the first group of data elements) in the memory region may be the data for the second group of data elements to be read in from the memory region, updated and written back to the memory, and so on.

In these other embodiments, the memory region may comprise memory portions of fixed data size allocated respectively to (reserved respectively for) the groups of data elements. In these embodiments writing back the updated data for the groups of data elements to memory may comprise writing back the updated data to the memory portions allocated to (reserved for) the groups respectively.

In these embodiments, the data for the first group of data elements to be read in from the memory region, updated and written back to the memory may, when written back, be written back to the last memory portion (e.g. having the highest memory address). In these other embodiments, the data for the second group of data elements to be read in from the memory region, updated and written back to the memory may, when written back, be written back to the next to last memory portion (e.g. having the next highest memory address), and so on. This can help to avoid overwriting the data for groups of data elements that are yet to be read in from memory.

In these embodiments, the fixed data size (e.g. in bits or bytes) of a memory portion may be at least the data size (e.g. in bits or bytes) that the data for the group that is stored therein could have when unencoded (e.g. uncompressed). The fixed data size (e.g. in bits or bytes) of a memory portion may be substantially equal to the data size (e.g. in bits or bytes) that the data for the group that is stored therein could have when unencoded (e.g. uncompressed). Again, this can help to avoid overwriting the data for groups of data elements that are yet to be read in from the memory region, whilst making good (e.g. contiguous) use of a memory region, e.g. that is of fixed data size.

As will be appreciated, the unencoded (e.g. uncompressed) data size (e.g. in bits or bytes) of the data for a group is dependent both on the group size in terms of data elements and the particular format used for the unencoded (e.g. uncompressed) data elements of the group. For example, for a group that is 64 (e.g. 8×8) data elements in size and that has 32 bits per data element, the data size of the data for the group of data elements (and thus, in embodiments, the fixed data size for the memory portion for that group) may be 256 bytes (i.e. [64×32]/8).

In these embodiments, where the block comprises M (e.g. 4) groups of fixed data size T (e.g. 256 bytes), the data for the first group of data elements to be read in from the memory, updated and written back to a memory region may be written back to a memory portion that starts at an offset address (M−1)T (e.g. 768 bytes) into the memory region, the data for the second group of data elements to be read in from the memory, updated and written back to the memory region may be written back to a memory portion that starts at an offset address which is at (M−2)T (e.g. 512 bytes) into the memory region, and so on.

In these embodiments, the updated data for first group of data elements written back to the memory may comprise either encoded (e.g. compressed) data or unencoded (e.g. uncompressed) data, whereas the updated data for the second group (and other subsequent groups) of data elements written back to the memory may comprise unencoded (e.g. uncompressed) data. These embodiments can help to avoid unwanted overwriting of stored data for groups of data elements yet to be read in, whilst making good (e.g. contiguous) use of a memory region, e.g. that is of fixed data size.

Alternatively, in these other embodiments, the updated data for the block may be written backwards (i.e. in the direction of decreasing memory addresses) starting with the memory address at the end of the memory region in question.

In any of these other embodiments, if/when the updated data for the block is further updated, the further update order may change to being the same as (may change to following) the arrangement order. For example, the updated data for the group of data elements arranged first in sequence in the memory (e.g. at the start address of the memory region in question) may become the first data set to be read in from the memory, further updated and written back to the memory, the updated data for the group of data elements arranged second in sequence in the memory may become the second data set to be read in from the memory, further updated and written back to the memory, and so on.

In these embodiments, the updated data for the first group of data elements to be read in from the memory region, further updated and written back to the memory may, when written back, be written starting at the start address of the memory region in question. In these embodiments, the updated data for the second group of data elements to be read in from the memory region, further updated and written back to the memory may, when written back, be written (directly) after the further updated data for the first group, and so on. This can help to avoid overwriting the updated data for groups of data elements that is yet to be read in from memory region in question.

In any of these other embodiments, if/when the further updated data for the block is yet further updated, the yet further update order may revert back to being the reverse of (may revert to running counter to) the arrangement order, for example as discussed above. Thus, as indicated above, in these other embodiments, the update order may alternate between being the reverse of (running counter to) the arrangement order and being the same as (following) the arrangement order, e.g. for a sequence of plural array (frame or texture) updates. Similarly, the direction in which the data for the block is written back may alternate between backwards (i.e. in the direction of decreasing memory addresses) and forwards (i.e. in the direction of increasing memory addresses), e.g. for a sequence of plural array (frame or texture) updates.

In embodiments, the (original) data for the block of data elements may be stored substantially contiguously in the memory region. Similarly, the updated data for the block of data elements may be stored substantially contiguously in memory. This can allow the data for the block as a whole to be more easily read in from the memory.

In some embodiments, writing back the updated data for the groups of data elements to memory may comprise writing the updated data to the same memory region as the memory region from which the data for the groups of data elements was read in. These embodiments can significantly reduce the amount of memory used when updating the data for the block of data elements.

In other embodiments, writing back the updated data for the groups of data elements to memory may comprise writing back the updated data to a different memory region allocated to (reserved for) the block to the memory region from which the data for the groups of data elements was read in. In these other embodiments, once the required (original) data for the block of data elements has been read in, the data processing apparatus may mark the previous memory region from which the required (original) data for the groups of data elements was read in as available for reuse, e.g. so as to be available for reallocation to another block of data elements of the array.

In embodiments, the different memory region allocated for the block may have a fixed data size. This use of a different allocated memory region of fixed data size can provide predicable memory usage and can therefore help to avoid unwanted overwriting of data. In these embodiments, the fixed data size (e.g. in bits or bytes) of the different memory region may be at least the data size (e.g. in bits or bytes) that the data for the block can have when unencoded (e.g. uncompressed). This can allow the different memory region to store the data for the block in a worst case scenario, e.g. when little or no compression is achieved or desired. The fixed data size (e.g. in bits or bytes) of the different memory region may be less than double, e.g. substantially equal to, the data size (e.g. in bits or bytes) that the data for the block can have when unencoded (e.g. uncompressed). This can significantly reduce the amount of memory used when storing/updating the data for the block, whilst still allowing the different memory region to store the data for the block in a worst case scenario, e.g. when little or no compression is achieved or desired.

In other embodiments, the different memory region allocated for the block may have a variable data size (e.g. in bits or bytes) that varies with and depends on the data size (e.g. in bits or bytes) of the data for the block stored therein. In these embodiments, the variable data size (e.g. in bits or bytes) of the different memory region may be less than or equal to the data size (e.g. in bits or bytes) that the data for the block can have when unencoded (e.g. uncompressed).

As discussed above, the block of data elements may be one of plural blocks of data elements that the array of data elements is divided into, for example for processing (e.g. encoding) purposes. In these embodiments, the data processing apparatus may allocate (reserve) a set of memory regions that can be used to store/update data for the blocks of the array. In these embodiments, the data processing apparatus may limit the number of memory regions that can be used to store/update the data for the blocks of the array. These embodiments can significantly reduce the amount of memory used when updating the data for the blocks of the array.

In some embodiments, the number of memory regions that can be used to store/update the blocks of the array may be equal to the number of blocks in the array (so that there is 1 (and only one) memory region for storing/updating the data for each block of the array).

In other embodiments, the number of memory regions that can be used to store/update the data for the blocks of the array may be more than the number of blocks in the array. In these embodiments, the number of memory regions that can be used to store/update the data for the blocks of the array may be less than double the number of blocks in the array. For example, the number of memory regions that can be used to store/update the data for the blocks of the array may be 1 more than the number of blocks in the array (so that there are enough memory regions for storing the data for the respective blocks of the array but also 1 (and only 1) memory region available for updating the data for a block of the array at a time). For another example, the number of memory regions that can be used to store/update the data for the blocks of the array may be 2 more than the number of blocks in the array (so that there are enough memory regions for storing the data for the respective blocks of the array but also 2 (and only 2) memory regions available for updating, e.g. in parallel, the data for 2 of the blocks of the array at a time), etc.

As discussed above, reading in the data for the block of data elements may comprise reading in a header for the block of data elements from memory. In these embodiments, writing back the updated data for the block of data elements may comprise modifying the header accordingly. For example, when writing back the updated data for a particular group and/or for the subblocks of a particular group of data elements to the same or a different memory region, the header (e.g. the data sizes and/or locations) may be modified to indicate the location of the updated data for the particular group and/or the subblocks of the particular group in that memory region and/or to indicate the direction (backwards or forwards) in which the data for the block, particular group and/or the subblocks of the particular group are stored. When writing back the updated data for a particular block to a different memory region, the header may be modified to indicate the location of that different memory region for the block in memory.

As will be appreciated, any of the above described processes that are performed in respect of the block of data elements in any embodiment may, in practice, be performed respectively for each (e.g. every) one of plural blocks, e.g. that form the array of data elements.

As will also be appreciated, any of the above described processes that are performed in respect of the block or array of data elements in any embodiment may, in practice, be performed respectively for each (e.g. every) one of sequence of plural array (frame or texture) updates.

The technology described herein can be used for all forms of arrays of data elements that a data (e.g. graphics or image) processing apparatus may provide and/or use, such as frames for display, graphics textures, render to texture outputs, etc. Thus, as indicated above, the array of data elements may comprise graphics or image data and/or may correspond to a frame or texture of graphics or image data.

The (original and/or updated) data for the block of data elements may accordingly be read in from memory and used as desired. In embodiments, the (original and/or updated) data for the block of data elements may be read in and outputted (e.g. by an output (e.g. display) processor), e.g. for display. In these embodiments, the array of data elements may correspond to all or part of a frame of graphics or image data and the data elements may correspond to pixels. In other embodiments, the (original and/or updated) data for the block of data elements may be read in and used (e.g. by a graphics processor) as a graphics texture. In these embodiments, the array of data elements may correspond to all or part of a graphics texture and the data elements may correspond to texels.

The reading in process, data processing operation, writing back process, and/or outputting process described herein in any embodiment may be performed by any desired and suitable (part of the) data processing apparatus.

For example, the reading in process, data processing operation, writing back process, and/or outputting process described herein in any embodiment may be performed by a graphics processor, a video processor, and/or an output (e.g. display) processor. The data processing apparatus may therefore comprise one or more of or may be: a graphics processor; a video processor; and an output (e.g. display) processor. Thus, the processing circuitry may form part of a graphics processor, a video processor, and/or an output (e.g. display) processor. The data processing apparatus may comprise, or may be, or may form part of, a system on chip (SoC).

In embodiments, the apparatus may comprise a memory controller configured to read in and/or write back the data for the groups of data elements of the block of data elements and/or the headers for the block of data elements from and/or to the memory.

The apparatus may comprise a cache configured to store (e.g. temporarily) the data read in for a (e.g. single) group of data elements of the block of data elements. The cache may be internal or local to the data processing apparatus. The cache may be internal or local to a graphics processor, a video processor, and/or an output (e.g. display) processor.

The memory referred to herein may be any desired and suitable memory of or for the data processing apparatus. The memory may be external to a graphics processor, a video processor, and/or an output (e.g. display) processor. The memory may be external to the data processing apparatus. The memory may be, for example, main system memory.

The data for the blocks of data elements may be read in from, stored in, and/or written back to a texture buffer or framebuffer of the memory. The memory may comprise an area (e.g. a "header buffer") for storing the headers for the respective blocks of data elements and/or an area (e.g. a "body buffer") comprising memory regions allocated for storing data for the respective blocks of data elements.

In an embodiment, the various functions of the technology described herein are carried out on a single data (e.g. graphics or image) processing platform that provides and/or uses the data elements of the array.

As will be appreciated by those skilled in the art, the data processing apparatus of the technology described herein may be part of an overall data (e.g. graphics or image) processing system that includes, for example, a host (e.g. central) processor, the memory, etc.

The host processor may, for example, execute applications that require data (e.g. graphics or image) processing by the data processing apparatus. The host processor may send appropriate commands and data to the data processing apparatus to control it to perform data (e.g. graphics or image) processing operations and to generate and/or use an (e.g. graphics or image) output required by applications executing on the host processor. To facilitate this, the host processor may execute a driver for the data processing apparatus and/or may execute a compiler or compilers for compiling (e.g. shader) programs to be executed by a programmable execution unit of the data processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the array.

The technology described herein can be implemented in any suitable apparatus or system, such as a suitably configured computer or micro-processor based apparatus or system. In an embodiment, the technology described herein is implemented in a computer and/or micro-processor based apparatus or system. In an embodiment, the technology described herein is implemented in a block-based or tile-based apparatus or system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the apparatus or system can otherwise include any one or more or all of the usual functional units, etc., that data (e.g. graphics or image) processing apparatus or systems include.

The various data (e.g. graphics or image) processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, graphics processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable storage medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As is discussed above, embodiments of the technology described herein relate to arrangements that comprise updating data for a block of data elements of an array of data elements stored in a memory region. Embodiments comprise reading in data for a first group of the data elements, updating the data for the first group, and then writing back the updated data to memory without overwriting data for a second group of the data elements that is yet to be read in from the memory region. Overwriting may be avoided by writing back the updated data for the first group starting at a selected memory address, for example other than the start address of the memory region. The data for the second group of data elements can then be read in, updated and written back to memory separately from the data for the first group. This can significantly reduce the amount of memory bandwidth and local cache that needs to be used at any one time when updating the data for the block.

Various embodiments of the technology described herein will now be described in the context of the processing of graphics data for display. However, the concepts described herein can equally be applied to contexts in which other types of data are updated.

FIG. 1 shows schematically an embodiment of a data processing system 100 that can update a block of an array of data elements in the manner of the technology described herein. In this embodiment, the system 100 comprises a data processing apparatus in the form of a system on chip (SoC) 102. The system 100 also comprises off-chip (main) memory 116 and a display device 118.

The SoC 102 comprises a central processing unit (CPU) 104, a graphics processing unit (GPU) 106, a video processor 108, a display controller 110, an interconnect 112 and a memory controller 114.

As is shown in FIG. 1, the CPU 104, GPU 106, video processor 108, and display controller 110 communicate with each other via the interconnect 112 and with the memory 116 via the interconnect 112 and memory controller 114. The display controller 110 also communicates with the display device 118.

In the following embodiments, the GPU 106 generates (e.g. renders) data for an array of data elements and writes that data out to the memory 116. The GPU 106 then later reads in and updates (e.g. performs further rendering using) that data. In other embodiments, the video processor 108 may read in data for an array of data elements (e.g. a current frame) and update that data (e.g. for a subsequent frame). In either case, the updated data is then written back out to the memory 116.

The updated data can then be read back out and used by the display device 118 to generate an output frame for display or by the GPU 106 as an updated graphics texture.

Figure 2:
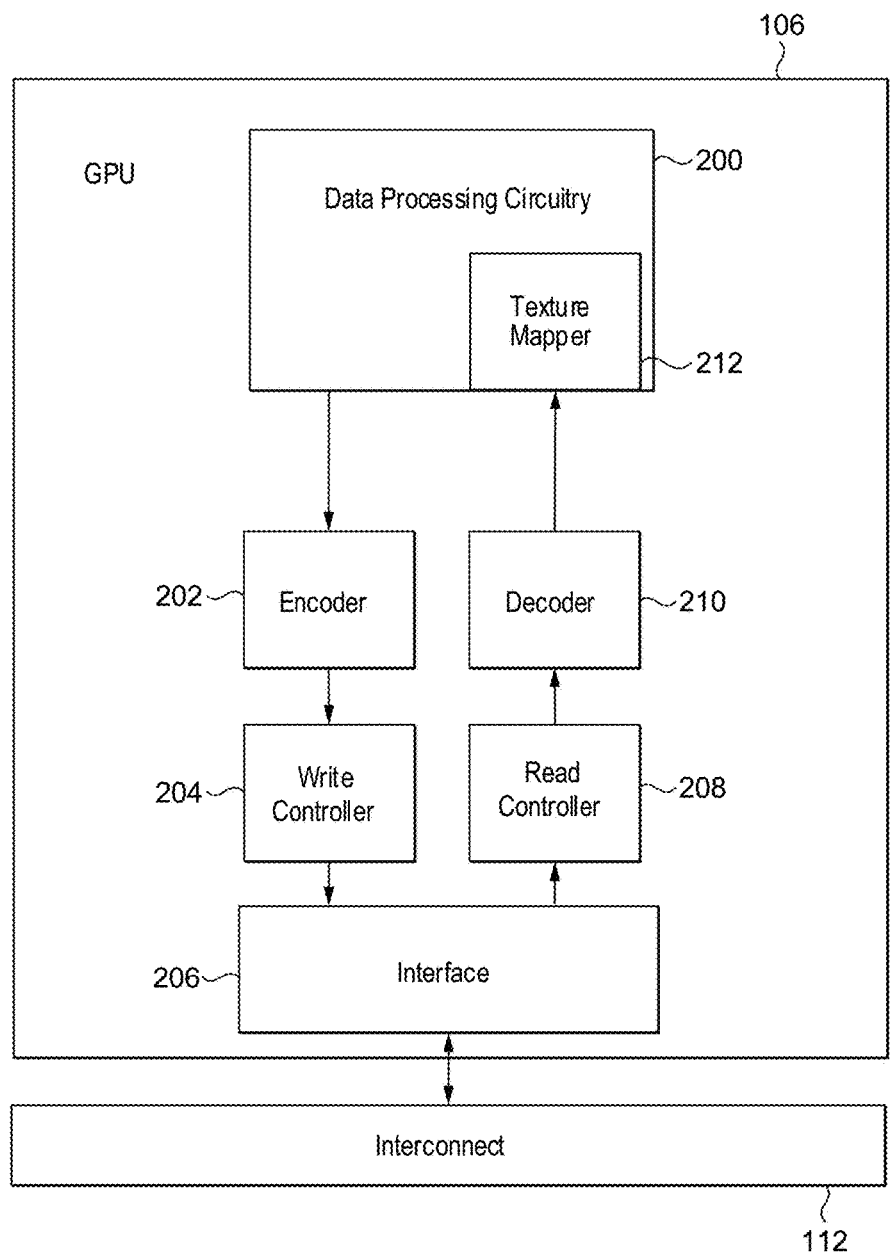
FIG. 2 shows schematically a graphics processor according to an embodiment of the technology described herein.

FIG. 2 shows further details of the GPU 106. In this embodiment, the GPU 106 comprises data processing circuitry 200 that generates data for an array (frame or texture) of data elements. In this embodiment, the data processing circuitry 200 generates the data elements for the array using a graphics processing pipeline that operates on similarly shaped non-overlapping blocks (so called "tiles") of the array.

The GPU 106 also comprises an encoder 202 that can encode each of the blocks separately. The data for a block of the array can then be written out to the memory 116 by write processing circuitry of a write controller 204 via an interface 206. The GPU 106 also comprises read processing circuitry of a read controller 208 that can read in, via the interface 206, data for a block of the array from the memory 116 for use as a texture. The data for the block can be decoded by a decoder 210 before being used by a texture mapper 212 of the data processing circuitry 200.

The graphics processing pipeline and rendering process will now be described in more detail with reference to FIG. 3.

Figure 3:
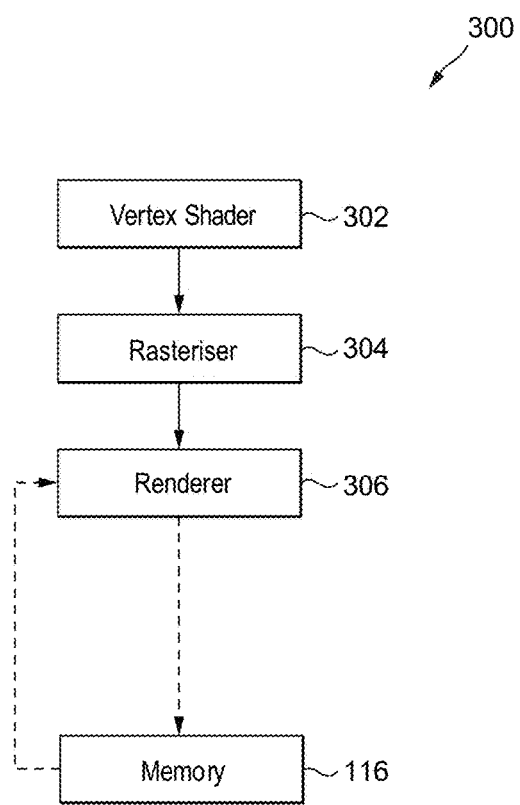
FIG. 3 shows a graphics processing pipeline that can be used in embodiments of the technology described herein.

As is shown in FIG. 3, the pipeline 300 comprises a sequence of different stages, with each stage performing a different operation on "primitives" (e.g. polygons) making up the surfaces of the features of the frame to prepare them for output.

First in the pipeline 300 is a vertex shader 302 which vertex shades the vertices of the primitives for the output being generated. The vertex shader 302 takes input data values associated with the vertices, etc., defined for the output to be generated, and processes those data values to generate a set of vertex shaded attribute data values for use by subsequent stages of the pipeline 300.

The rasteriser 304 then operates to rasterise the primitives making up the render output into individual graphics fragments for processing. To do this, the rasteriser 304 receives the graphics primitives for rendering, rasterises the primitives to sampling points and generates graphics fragments representing appropriate sampling positions for rendering the primitives. The fragments generated by the rasteriser 304 are then sent onwards to the rest of the pipeline 300 for processing.

The graphics fragments generated by the rasteriser 304 are then passed to the renderer 306 for shading. The output of the renderer 306 is an array of appropriately shaded, e.g. colour, values for sampling positions for the frame. The output of the renderer 306 is then stored in the memory 116.

The renderer 306 includes a number of different processing units, such as a fragment shader, blender, texture mapper 212, etc. In particular, as shown in FIG. 3, the renderer 306 will, inter alia, read in (texture) data using the read controller 208, use that data to generate an updated (textured) output, and write back the updated data using the write controller 204 in the manner described herein.

This updated data can then be read from the memory 116 and used by the display controller 110 to generate an output frame for display on the display device 118. Alternatively, the updated data can be read back in and used by the GPU 106 as an updated graphics texture.

In other embodiments, the video processor 108 may comprise a read controller, encoder, data processor, decoder and/or write controller similar to those of the GPU 106.

Other arrangements for the data processing system 100 would, of course, be possible.

Processes that comprise updating a block (e.g. tile) of an array (e.g. frame or texture) of data elements, will now be described in more detail with reference to FIGS. 4-12.

Figure 4:
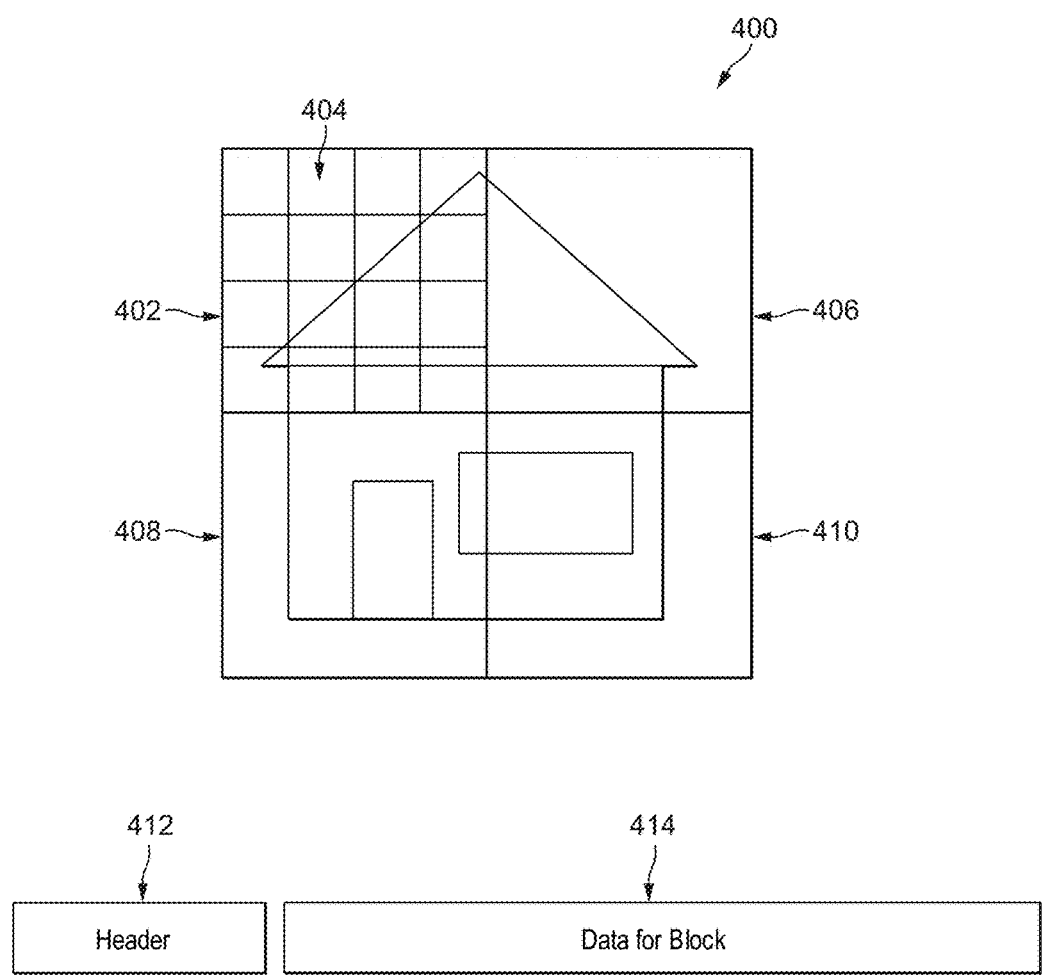
FIG. 4 shows an array of data elements to be updated, together with a data structure for a block of the array, which comprises a header and data for the block, according to an embodiment of the technology described herein.

FIG. 4 shows an array 400 that is 32×32 data elements in size. As is shown in FIG. 4, the array 400 is divided into 4 (i.e. 2×2) blocks of data elements 402, 406, 408, 410 for processing and encoding purposes. In this embodiment, each block 402, 406, 408, 410 is 16×16 data elements in size. In this embodiment, each data element has an RGBA8 format. Thus, each data element comprises an 8-bit red (R) data value, an 8-bit green (G) data value, an 8-bit blue (B) data value and an 8-bit transparency (α) data value, giving 32 bits in total per data element. In this embodiment, the unencoded data size of each block is therefore 1024 bytes (i.e. 16×16× 32/8). Other array sizes, block sizes and data element formats could of course be used as desired.

As is also shown in FIG. 4 for block 402, each block of data elements is further divided into 16 (i.e. 4×4) subblocks 404 for encoding purposes. In this embodiment, each subblock 404 is 4×4 data elements in size. In these embodiments, the size of each subblock is therefore 64 bytes (i.e. 4×4×32/8). Again, other subblock sizes could be used as desired.

In this embodiment, the encoding scheme that is used when encoding a block is a lossless entropy encoding scheme. In this embodiment, the data size of the encoded data for the block in question is not fixed and is based on the particular data values of the data elements of the block. In this embodiment, a block of substantially uniform colour will tend to compress to encoded data that is smaller in data size than for a block of more highly varied colour. Further details of a suitable encoding scheme can be found, for example, in US 2013/0034309 or US 2013-0195352, the entire contents of which are incorporated herein by reference. Other encoding schemes could of course be used as desired.

FIG. 4 also shows a header 412 and data 414 for the block 402 according to an embodiment of the technology described herein. In this embodiment, the header 412 will be stored in a "header buffer" of the memory 116 and the data 414 will be stored in a "body buffer" of the memory 116. The header buffer and body buffer may, for example, form part of a frame buffer or texture buffer.

In this embodiment, the header 412 for the block 404 comprises an offset from the start of the header buffer to the data 414 for the block 404 in the body buffer. This offset allows the data 414 for the block 404 to be located in memory 116. In this embodiment, the header 412 for the block 404 also comprises offsets to the data for each of the 16 (i.e. 4×4) subblocks 404 of the block 402. The header 412 can also or instead comprises a data size for the encoded data for each of the 16 (i.e. 4×4) subblocks 404 of the block 402. These offsets and/or data sizes allow each of the subblocks 404 to be located in the memory region in question.

A process of storing headers in memory will now be described with reference to FIG. 5.

FIG. 5 again shows the blocks 402, 406, 408, 410 for the array 400. FIG. 5 also shows the order (i.e. from 0 to 3) in which the respective headers 504, 506, 508, 510 for the blocks 402, 406, 408, 410 are stored in memory. As is shown in FIG. 5, in this embodiment, the headers 504, 506, 508, 510 for the blocks 402, 406, 408, 410 are stored contiguously in a header buffer 502 based on raster order. Other storage orders could be used as desired, such as Morton or z-order, U order etc.

Figure 5:
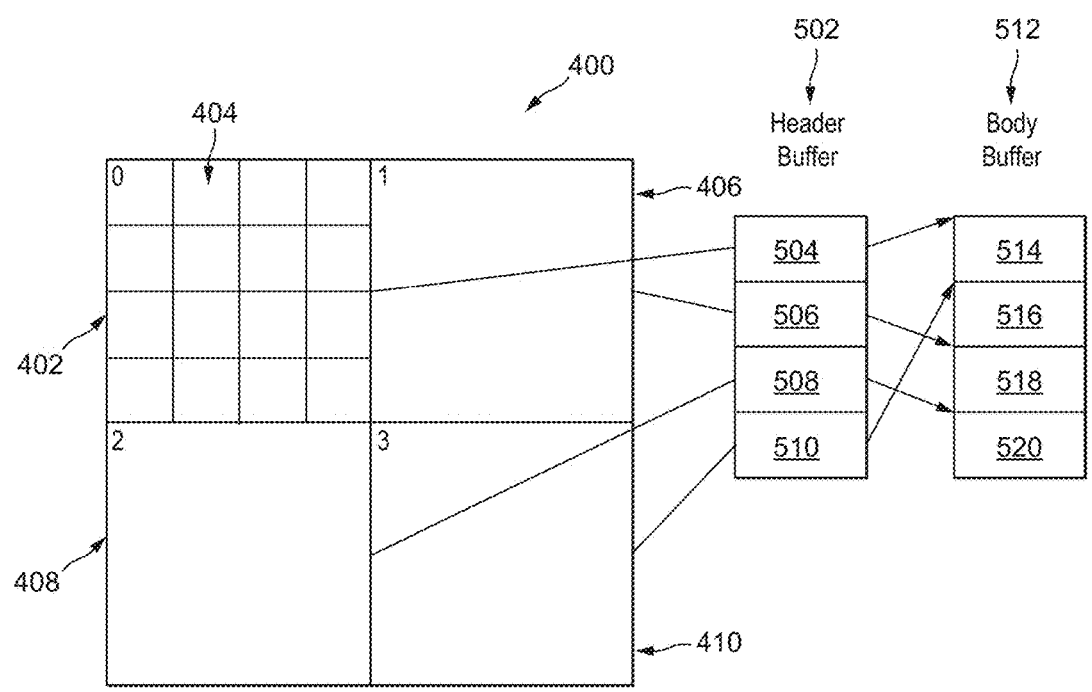
FIG. 5 shows an array of data elements, a header buffer for storing headers for the blocks of the array of data elements, and a body buffer for storing corresponding data for the blocks of the array of data elements, according to an embodiment of the technology described herein.

FIG. 5 also shows how the headers 504, 506, 508, 510 in the header buffer 502 indicate allocated memory regions 514, 516, 518, 520 in a body buffer 512 in which the data for the blocks 402, 406, 408, 410 is stored. As is shown in FIG. 5, the use of headers 504, 506, 508, 510 means that the data for the blocks 402, 406, 408, 410 does not need to be stored in any particular order in the body buffer 512. In this embodiment, the memory regions 514, 516, 518, 520 are of fixed data size, which provides predictable memory use. In this embodiment, the data size of each memory region 514, 516, 518, 520 is the data size of each block 402, 406, 408, 410 in its fully unencoded state (i.e. 1024 bytes).

In order to highlight the benefits of embodiments of the technology described herein, a method in which data in a memory region is overwritten by updated data will initially be described with reference to FIG. 6.

FIG. 6 again shows the blocks 402, 406, 408, 410 of the array 400 of FIG. 4. The block 402 is again shown as being divided into 16 (4×4) subblocks 404 for encoding purposes. In this example, the block 402 can also be divided into 2 (1×2) notional groups of data elements. The first notional group 602 comprises the upper 8 (4×2) subblocks 404 of the block 402 and the second notional group 604 comprises the lower 8 (4×2) subblocks 404 of the block 402.

Figure 6:
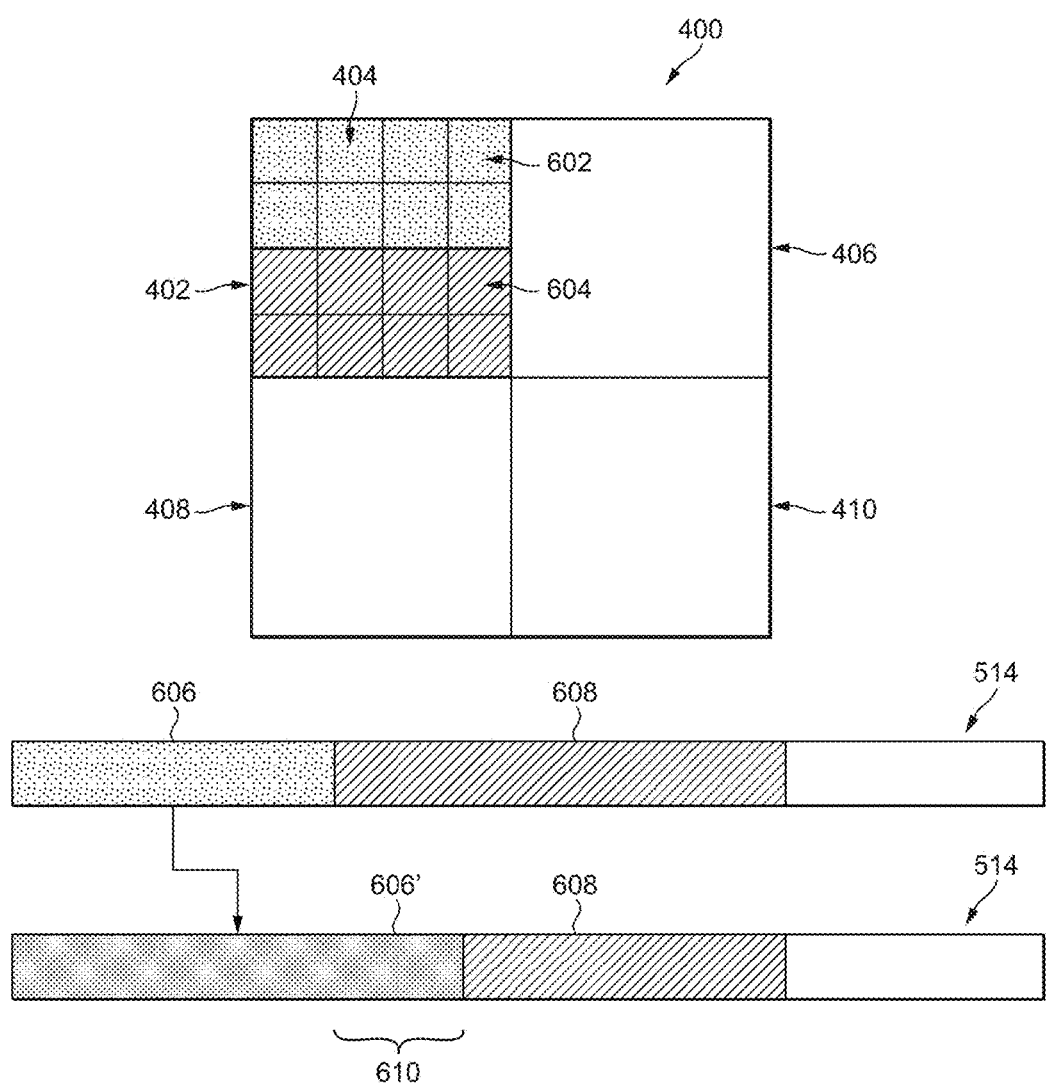
FIG. 6 schematically illustrates a method of updating a block of an array in which data is overwritten.

FIG. 6 also shows the memory region 514 allocated to the block 402 in an initial state and then, underneath that, a partially updated state. As is shown in FIG. 6, in the initial state, the memory region 514 comprises initial (compressed) data 606 for the first notional group 602 and initial (compressed) data 608 for the second notional group 604. As is also shown in FIG. 6, if the data in the memory region 514 is partially updated (e.g. if the initial data 606 for the first notional group 602 were to be read in from the memory region 514, then updated, and then written back out to the same location in the memory region 514), the updated data 606' for the first notional group 602 would, if larger in data size than then initial data 606 for the first notional group 602 (e.g. if the updated data 606' is less compressed or entirely uncompressed), overwrite both the initial data 606 for the first notional group 602 and a portion 610 of the initial data 608 for the second notional group 604. In this case, it would not then be possible to read in and update the initial data 608 for the second notional group 604 so as to fully update the data for the block 402.

In order to avoid overwriting the initial data needed for updating the block 402 in situations such as this, a conventional approach would be to read in the initial data for the entire block 402 from the memory region 514, update the data for the entire block 402, and then write back the updated data for the entire block 402 to the memory region 514. However, this would mean that sufficient memory bandwidth and cache needs to be available to read in the initial data for the entire block 402.

Figure 7:
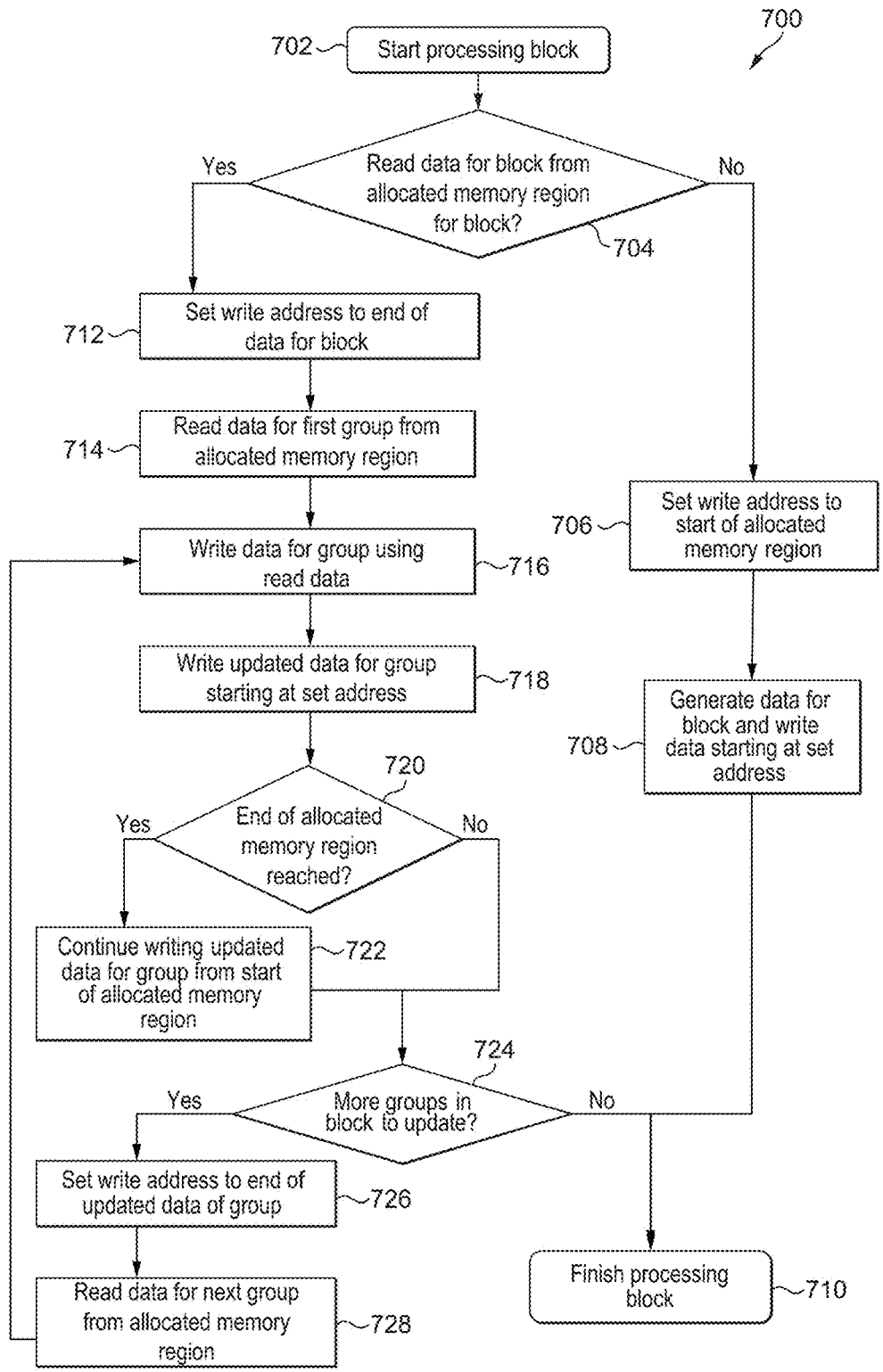
FIG. 7 shows a method of updating a block of an array according to an embodiment of the technology described herein.

A method of updating a block of an array of data elements according to an embodiment of the technology described herein will now be described with reference to FIGS. 7 and 8. FIG. 7 shows the steps of the method and FIG. 8 graphically illustrates one embodiment of the method of FIG. 7.

Reference will initially be made to FIG. 8, which again shows the block 402, 406, 408, 410 of the array 400 of FIG. 4. As is shown in FIG. 8, the block 402 is again divided into 16 (4×4) subblocks 404 for encoding purposes.

In this embodiment, the block 402 is also divided into 2 (1×2) distinct groups of data elements for memory management purposes. The first group 802 comprises the upper 8 (4×2) subblocks of the block 402 and the second group 804 comprises the lower 8 (4×2) subblocks of the block 402.

Referring now to the method 700 of FIG. 7, the processing of the block 402 starts at step 702. Then, at step 704, it is determined whether data for the block 402 needs to be read in from the memory region 514 allocated for that block 402.

In this regard, when the data for the block 402 is initially being generated, and thus does not rely on previous data for the block 402, there is no need to read in previous data for the block 402 from the memory region 514 allocated for that block 402. In this case, the method proceeds in a conventional manner. In particular, at step 706, the write address is set to the start of the memory region 514. Then, at step 708, data for the block 402 is generated (and compressed, if desired), and the data is written out staring at the set address. The initial processing of the block 402 for the current frame then finishes at step 710.

Figure 8:
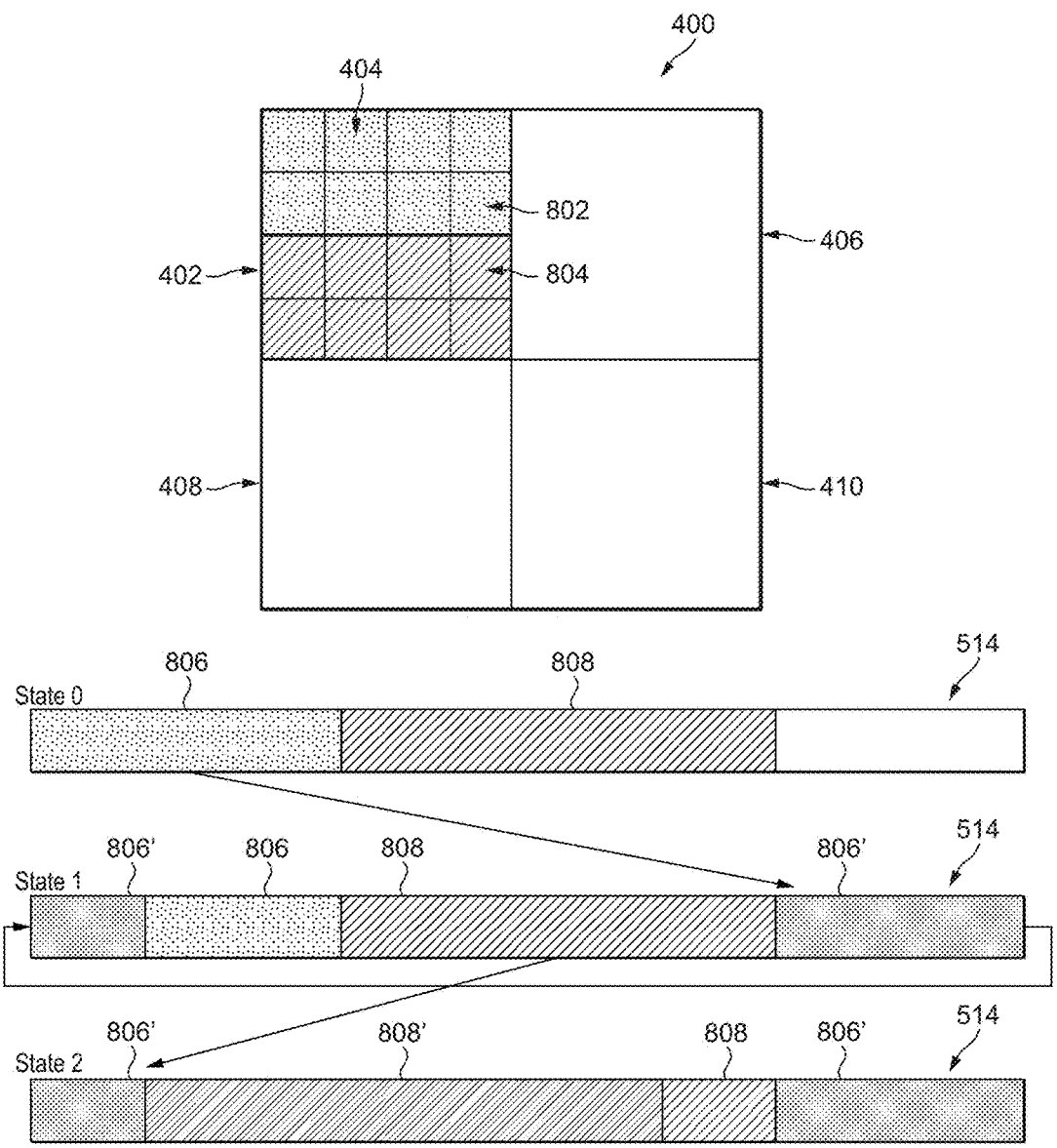
FIG. 8 schematically illustrates one embodiment of the method of FIG. 7.

FIG. 8 shows the initial state State0 for the memory region 514 at this point. As is shown in FIG. 8, the data 806 for the first group 802 and the data 808 for the second group 804 are arranged in the memory region 514 in vertical raster order with respect to the way in which the groups make up the block 402. As is also shown in FIG. 8, the data is stored contiguously in the memory region 514.

Referring again to FIG. 7, for the next frame, the processing of the block 402 again starts at step 702. Then, at step 704, it is again determined whether data for the block 402 needs to be read in from the memory region 514 allocated for that block 402.

In this regard, when the data for the block 402 is to be updated based on data for the block 402 from the previous frame, the method proceeds, at step 712, by setting the write address to the end of the initial data for the block 402, rather than the start of the memory region 514. Then, at step 714, the data 806 for the first group 802 is read in from the memory region 514 and cached locally. Then, at step 716, the data 806 for the first group 802 is updated. Then, at step 718, the updated data 806' for the first group is written back to the memory region 514 staring at the set address, i.e. starting at the end of the initial data for the block 402, rather than the start of the memory region 514.

When writing back the updated data, it is also determined at step 720 whether the end of the memory region 514 has been reached. In the case of the updated data 806' for the first group 802, the end of the memory region 514 is reached when writing back the updated data. When the end of the memory region 514 is reached then, at step 722, the updated data 806' continues to be written from the start of memory region 514 in the manner of a "ring buffer".

FIG. 8 shows a partially updated state State1 for the memory region 514 at this point. As is shown in FIG. 8, setting the write address to the end of the initial data for the block 402, rather than the start of the memory region 514, and using the memory region 514 as a ring buffer, together with the data size of the memory region 514 used, means that the data 808 for the second group 804 will not be overwritten, even if the updated data 806' for the first group 802 is larger than (e.g. entirely uncompressed or at least less compressed than) the initial data 806 for the first group 802. In this embodiment, the updated data 806' for the first group 802 is compressed to a lesser degree than the initial data 806 for the first group 802, but could be entirely uncompressed in other embodiments.

Referring again to FIG. 7, it is then determined at step 724 whether there are more groups in the block 402 to update. When there are more groups in the block 402 to update then, at step 726, the write address is set to the end of updated data 806' of the first group 802. Then, at step 728, the data 808 for the second group 804 is read in from the memory region 514 and cached locally. Then, returning to step 716 again, the data 808 for the second group 804 is updated. Then, at step 718 again, the updated data 808' for the second group 804 is written back to the memory region 514 staring at the set address, i.e. starting at the end of updated data 806' of the first group 802.

It is again determined at step 720 whether the end of the memory region 514 has been reached. In the case of the updated data 808' for the second group 804, the end of the memory region 514 is not reached. Then, it is again determined at step 724 whether there are more groups in the block 402 to update. When there are no more groups in the block 402 to update then, at step 710, the processing of the block 402 for the current frame finishes.

FIG. 8 shows a fully updated state State2 for the memory region 514 at this point. As is shown in FIG. 8, setting the write address to the end of the updated data 806' of the first group 802, together with the data size of the memory region 514 used, means that the update data 808' for the second group 804 will not overwrite the updated data 806' for the first group 802, even if the updated data 808' for the second group 804 is larger than (e.g. entirely uncompressed or at least less compressed than) the initial data 808 for the second group 804. In this embodiment, the updated data 808' for the second group 804 is again compressed to a lesser degree than the initial data 808 for the second group 804, but could be entirely uncompressed in other embodiments.

At this point, the header 504 for the block 402 can be suitably modified to indicate the new locations of the subblocks 404 of the block 402. In this embodiment, this comprises modifying the respective offsets and data sizes for the subblocks 404 of the block 402.

Referring again to FIG. 7, in the next frame, the processing of the block 402 again starts at step 702. Then, at step 704, it is again determined whether data for the block 402 needs to be read in from the memory region 514 allocated for that block 402. When the data for the block 402 is not to be updated based on data for the block 402 from the previous frame, the method proceeds via step 706 as discussed above. When the data for the block 402 is to be updated based on data for the block 402 from the previous frame, the method proceeds via step 712 as discussed above.

Figure 9:
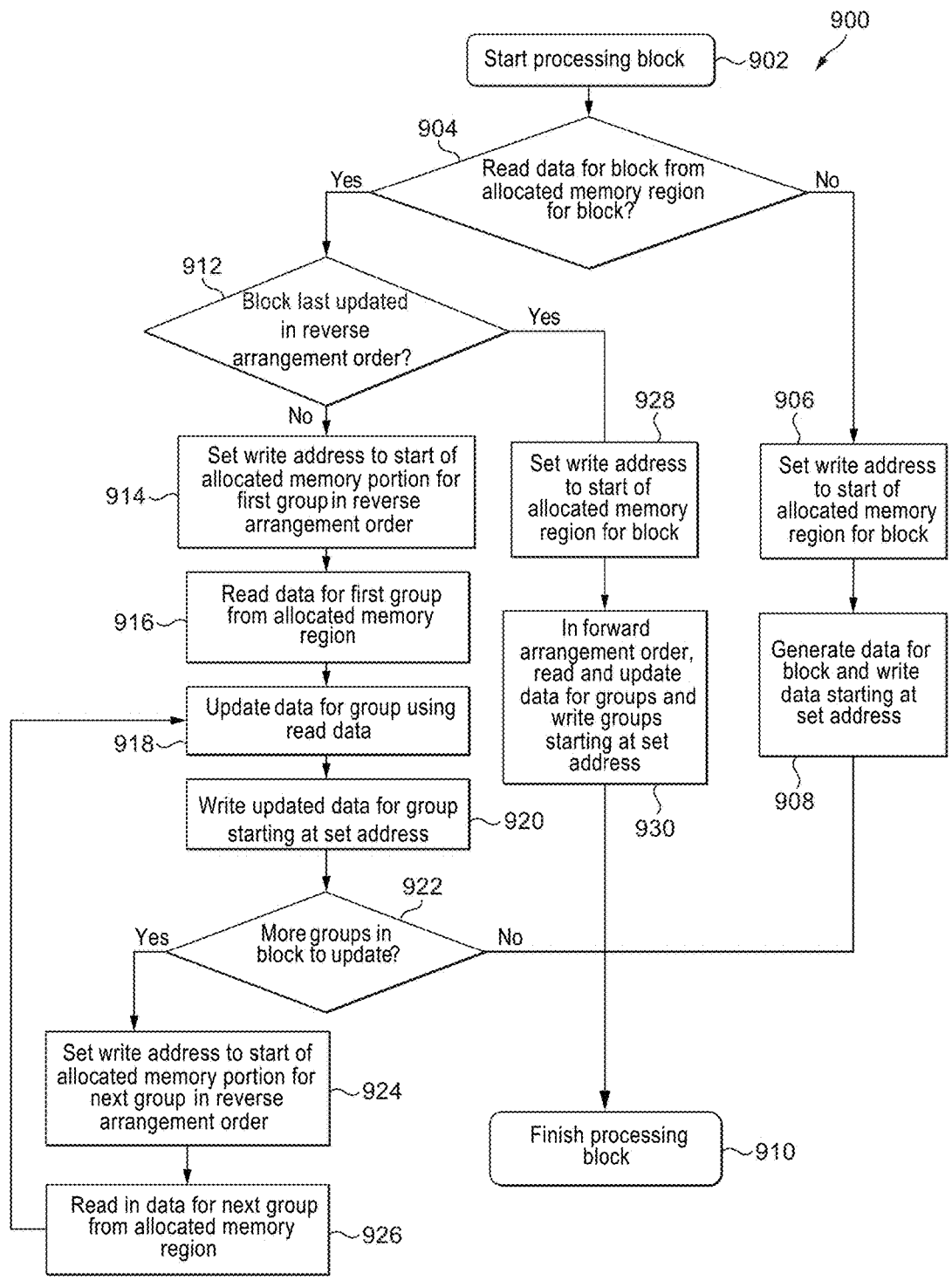
FIG. 9 shows a method of updating a block of an array according to another embodiment of the technology described herein.

A method of updating a block of an array of data elements according to another embodiment of the technology described herein will now be described with reference to FIGS. 9 and 10. FIG. 9 shows the steps of the method and FIG. 10 graphically illustrates one embodiment of the method of FIG. 9.

Reference will initially be made to FIG. 10, which again shows the blocks 402, 406, 408, 410 of the array 400 of FIG.

4. As is shown in FIG. 10, the block 402 is again divided into 16 (4×4) subblocks 404 of data elements for encoding purposes.

In this embodiment, the block 402 is also divided into 4 (2×2) groups of data elements for memory management purposes. As is shown in FIG. 10, the 4 groups comprise, in reverse U order, a first group 1008 of the 4 lower-left (2×2) subblocks of the block 402, a second group 1006 of the 4 lower-right (2×2) subblocks of the block 402, a third group 1004 of the 4 upper-right (2×2) subblocks of the block 402, and a fourth group 1002 of the 4 upper-left (2×2) subblocks of the block 402.

Referring now to the method 900 of FIG. 9, the processing of the block 402 starts at step 902. Then, at step 904, it is determined whether data for the block 402 needs to be read in from the memory region 514 allocated for that block 402.

In this regard, as discussed above, when the data for the block 402 is initially being generated, and thus does not rely on previous data for the block 402, there is no need to read in previous data for the block 402 from the memory region 514 allocated for that block 402. In this case, the method proceeds in a conventional manner. In particular, at step 906, the write address is set to the start of the memory region 514. Then, at step 908, data for the block 402 is generated (and compressed, if desired), and the data is written out staring at the set address. The initial processing of the block 402 for the current frame then finishes at step 710.

Figure 10:
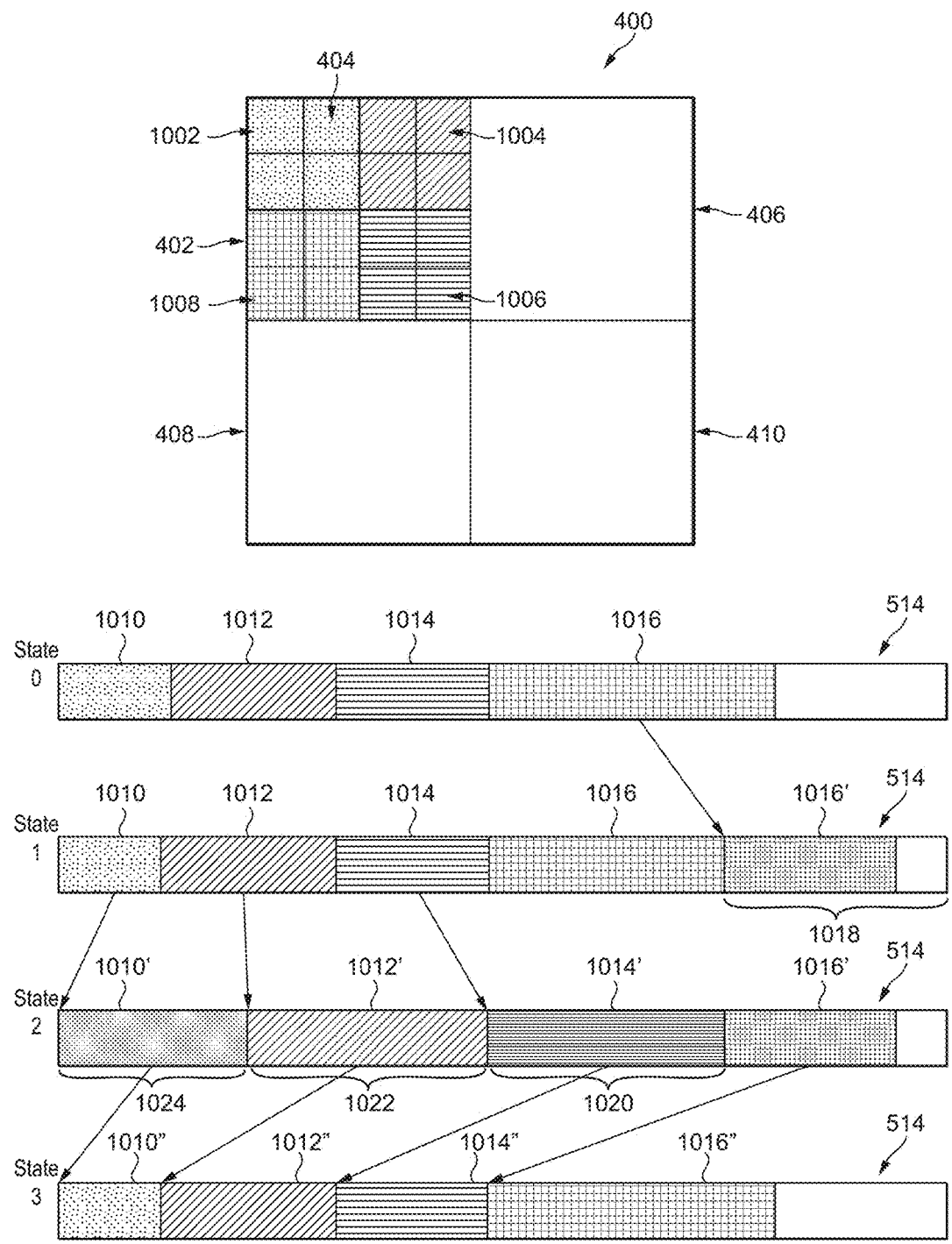
FIG. 10 schematically illustrates one embodiment of the method of FIG. 9.

FIG. 10 shows the initial state State0 for the memory region 514 at this point. As is shown in FIG. 10, the data 1016 for the first group 1008, the data 1014 for the second group 1006, the data 1012 for the third group 1004, and the data 1010 for the fourth group 1002, are arranged in the memory region 514 in forward U order with respect to the way in which the groups make up the block 402. Other arrangement orders could be used as desired, such as raster order, Morton or z-order, etc. As is also shown in FIG. 10, the data is stored contiguously in the memory region 514.

Referring again to FIG. 9, for the next frame, the processing of the block 402 again starts at step 902. Then, at step 904, it is again determined whether data for the block 402 needs to be read in from the memory region 514 allocated for that block 402.

In this regard, when the data for the block 402 is to be updated based on data for the block 402 from the previous frame, the method proceeds, at step 912, by determining whether the block was last updated in reverse arrangement (in this case, reverse U) order. The significance of this determination will be discussed in more detail below.

When the block was not last updated in reverse arrangement order (as is the case at State0 in FIG. 10), the method proceeds, at step 914, by setting the write address to the start of an allocated memory portion within the memory region 514 for the first group in reverse arrangement order.

With regard to the allocated memory portions, in this embodiment, each of the groups has a memory portion within the memory region 514 allocated to it. In this embodiment, the data size of each allocated memory portion is the data size of each group 1002, 1004, 1006, 1008 in its fully uncompressed state. Thus, in this embodiment, the data size of each allocated memory portion is 256 bytes (i.e. 1024 bytes for the block/4 groups).

In the embodiment of FIG. 10, the first group in reverse arrangement order is the first group 1008 and the allocated memory portion for the first group 1008 is memory portion 1018. In this embodiment, the start address of the memory portion 1018 for the first group 1008 is at 768 bytes (i.e. (4−1)×256 bytes) into the memory region 514.

Referring again to FIG. 9, at step 916, data 1016 for the first group 1008 is then read in from the memory region 514 and cached locally. Then, at step 918, the data 1016 for the first group 1008 is updated. Then, at step 920, the updated data 1016' for the first group 1008 is written back to the memory region 514 staring at the set address, i.e. starting at the start of the allocated memory portion 1018, rather than the start of the memory region 514.

FIG. 10 shows a partially updated state State1 for the memory region 514 at this point. As is shown in FIG. 10, setting the write address to the start of the allocated memory portion 1018 for the first group 1008, rather than the start of the memory region 514, means that the data for the other groups will not be overwritten, even if the updated data 1016' for the first group 1008 is larger than (e.g. entirely uncompressed or at least less compressed than) the initial data 1016 for the first group 1008. In this embodiment, the updated data 1016' for the first group 1008 is compressed to a greater degree than the initial data 1016 for the first group 1008, but could be compressed to a lesser degree or even entirely uncompressed in other embodiments.

Referring again to FIG. 9, it is then determined at step 922 whether there are more groups in the block 402 to update. When there are more groups in the block 402 to update then, at step 924, the write address is set to the start of the next group in reverse arrangement order.

In the embodiment of FIG. 10, the next group in reverse arrangement order is the second group 1006 and the allocated memory portion for the second group 1006 is memory portion 1020. The start address of the memory portion 1020 for the second group 1006 is at 512 bytes (i.e. (4−2)×256 bytes) into the memory region 514.

Referring again to FIG. 9, at step 926, data 1014 for the second group 1006 is read in from the memory region 514 and cached locally. Then, returning to step 918, the data 1014 for the second group 1006 is updated. Then, at step 920 again, the updated data 1014' for the second group 1006 is written back to the memory region 514 staring at the set address, i.e. starting at the start of the allocated memory portion 1020.

It is then again determined at step 922 whether there are more groups in the block 402 to update. As discussed above, when there are more groups in the block 402 to update then, at step 924, the write address is set to the start of the next group in reverse arrangement order.

In the embodiment of FIG. 10, the next group in reverse arrangement order is the third group 1004 and the allocated memory portion for the third group 1004 is memory portion 1022. The start address of the memory portion 1022 for the third group 1004 is at 256 bytes (i.e. (4−3)×256 bytes) into the memory region 514.

Referring again to FIG. 9, at step 926, data 1012 for the third group 1004 is read in from the memory region 514 and cached locally. Then, returning to step 918, the data 1012 for the third group 1004 is updated. Then, at step 920 again, the updated data 1012' for the third group 1004 is written back to the memory region 514 staring at the set address, i.e. starting at the start of the allocated memory portion 1022.

It is then again determined at step 922 whether there are more groups in the block 402 to update. As discussed above, when there are more groups in the block 402 to update then, at step 924, the write address is set to the start of the next group in reverse arrangement order.

In the embodiment of FIG. 10, the next group in reverse arrangement order is the fourth group 1002 and the allocated memory portion for the fourth group 1002 is memory portion 1024. The start address of the memory portion 1024 for the fourth group 1002 is at 0 bytes (i.e. (4−4)×256 bytes) into the memory region 514.

Referring again to FIG. 9, at step 926, data 1010 for the fourth group 1002 is read in from the memory region 514 and cached locally. Then, returning to step 918, the data 1010 for the fourth group 1002 is updated. Then, at step 920 again, the updated data 1010' for the fourth group 1002 is written back to the memory region 514 staring at the set address, i.e. starting at the start of the allocated memory portion 1024.

It is then again determined at step 922 whether there are more groups in the block 402 to update. When there are no more groups in the block 402 to update then, at step 910, the processing of the block 402 for the current frame finishes.

At this point, the header 504 for the block 402 can be suitably modified to indicate the new locations of the subblocks 404 of the block 402. In this embodiment, this comprises modifying the respective offsets and data sizes for the subblocks 404 of the block 402.

FIG. 10 shows a fully updated state State2 for the memory region 514 at this point. As is shown in FIG. 10, setting the write address to the start of the next group in reverse arrangement order each time a group is to be updated, together with the data size of the memory portions used, means that the updated data for the group currently being updated will not overwrite the data for any groups yet to be updated and will not overwrite the updated data for any groups already updated, even if the updated data for the group currently being updated is larger than (e.g. entirely uncompressed or at least less compressed than) the previous data for that group. In this embodiment, the updated data for all of the groups (except optionally the first group 1008) is written back in uncompressed form. This means that the updated data stored in the memory region 514 remains contiguous.

Referring again to FIG. 9, in the next frame, the processing of the block 402 again starts at step 902. Then, at step 904, it is again determined whether data for the block 402 needs to be read in from the memory region 514 allocated for that block 402. When the data for the block 402 is not to be updated based on data for the block 402 from the previous frame, the method proceed via step 906 as discussed above. When the data for the block 402 is to be further updated based on data for the block 402 from the previous frame, the method proceeds, at step 912, by determining whether the block was last updated in reverse arrangement order.

When the block was last updated in reverse arrangement order (as is the case at State2 in FIG. 10), the method proceeds, at step 928, by setting the write address to the start of the memory region 514. Then, at step 930, data 1010', 1012', 1014', 1016' for the groups is read in and cached locally, the data 1010', 1012', 1014', 1016' for the groups is further updated (and compressed if desired), and the further updated data 1010", 1012", 1014", 1016" for each group in question is written back out to the memory region 514 staring at the set address, i.e. the start of the memory region 514.

In this embodiment, this further update process is performed separately in respect of each group in forward arrangement order (i.e. fourth group 1002, then third group 1004, then second group 1006, then first group 1008) rather then reverse arrangement order. The further processing of the block 402 for the frame then finishes at step 910.

FIG. 10 shows a fully further updated state State3 for the memory region 514 at this point. As is shown in FIG. 10, in this frame, setting the write address to the start of the memory region 514 and then reading in, updating and writing back the further updated data in forward arrangement order, together with the data size of the memory portions used during the previous update, means that the further updated data for the group currently being further updated will not overwrite the updated data for any groups yet to be further updated and will not overwrite the further updated data for any groups already further updated.

At this point, the header 504 for the block 402 can be suitably further modified to indicate the new locations of the subblocks 404 of the block 402. In this embodiment, this again comprises modifying the respective offsets and data sizes for the subblocks 404 of the block 402.

Various alternative embodiments that are based on the embodiment which is described with reference to FIGS. 9 and 10 are contemplated.

For example, in some embodiments, steps 912, 928 and 930 of FIG. 9 may be omitted. In these embodiments, when the data for the block 402 is to be further updated based on updated data for the block 402 from the previous frame, the method always proceeds via step 914 as discussed above.

For another example, in some embodiments, once the data for the respective groups is stored in respective memory portions as shown in State2 of FIG. 10, in the next frame, the updated data for the respective groups can be read in, further updated and written back to the respective memory portions in any desired order (e.g. in forward arrangement order). In these embodiments, the further updated data for the groups (except optionally the first group 1008) may again be written back in uncompressed form, such that the further updated data stored in the memory region 514 remains contiguous. In these embodiments, the process may continue in a similar manner for successive frames.

For yet another example, in some embodiments, rather than writing back the updated data for the respective groups to respective memory portions, the updated data may be written back backwards (i.e. to decreasing memory addresses) in reverse arrangement order (i.e. first group 1008, then second group 1006, then third group 1004, then fourth group 1002) starting with the end address of the memory region 514. In these embodiments, the updated data for the groups may be written back in compressed form, if desired. In these embodiments, in the next frame, the further updated data may be written back forwards (i.e. to increasing memory addresses) in forward arrangement order (i.e. fourth group 1002, then third group 1004, then second group 1006, then first group 1008) starting with the start address of the memory region 514. Again, in these embodiments, the further updated data for the groups may be written back in compressed form, if desired. In these embodiments, the process may continue in a similar manner, but alternating between writing back the updated data backwards in reverse arrangement order and writing back the updated data forwards in forward arrangement order, for successive frames.

It will be appreciated that various combinations of the update processes described in the above embodiments can also be used as desired for subsequent successive frames.

Figure 11:
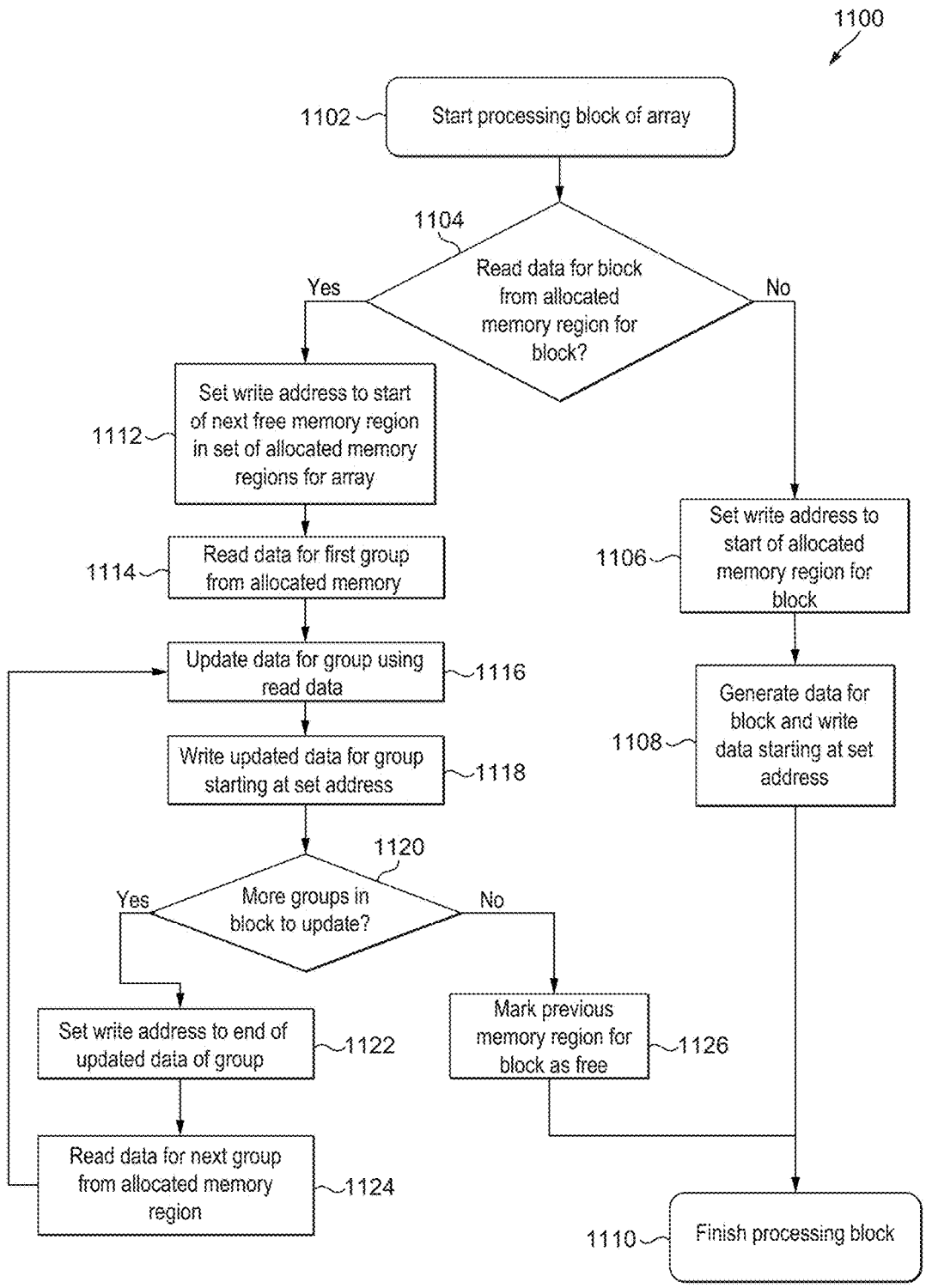
FIG. 11 shows a method of updating plural blocks of an array according to yet another embodiment of the technology described herein.

A method of updating plural blocks of an array according to yet another embodiment of the technology described herein will now be described with reference to FIGS. 11 and 12. FIG. 11 shows the steps of the method and FIG. 12 graphically illustrates one embodiment of the method of FIG. 11.

Reference will initially be made to FIG. 12, which again shows the blocks 402, 406, 408, 410 of the array 400 of FIG. 4. As is shown in FIG. 12, the block 402 is again divided into 16 (4×4) subblocks 404 of data elements for encoding purposes. In this embodiment, the block 402 is also divided into any desired and suitably sized groups of data elements (not shown) for memory management purposes. The other blocks 406, 408, 410 of the array 400 are similarly divided into subblocks and groups of data elements.

Figure 12:
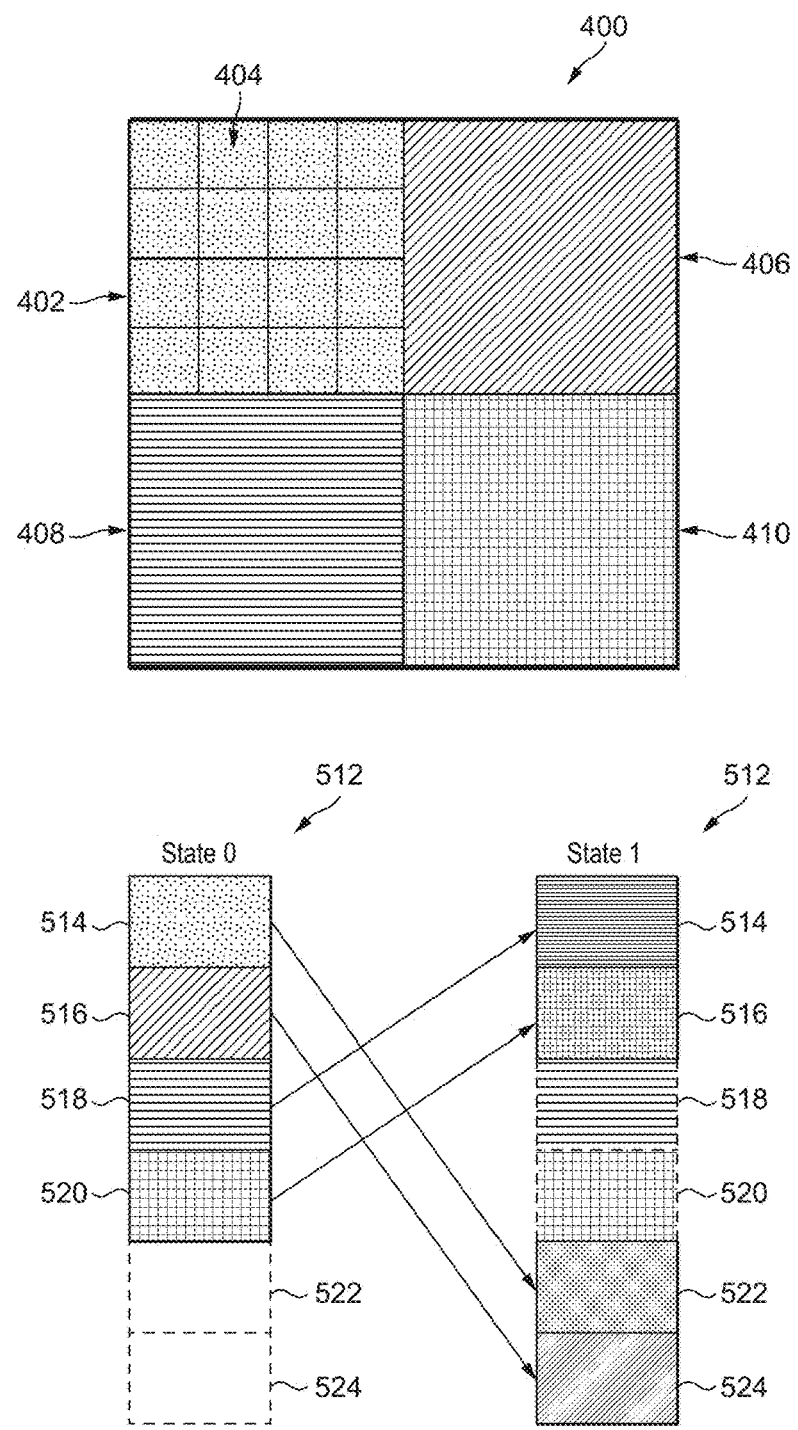
FIG. 12 schematically illustrates one embodiment of the method of FIG. 11.

FIG. 12 also shows the body buffer 512 of FIG. 5, together with the memory regions 514, 516, 518, 520 allocated to the respective blocks 402, 406, 408, 410. FIG. 12 also shows two free memory regions 522, 524 that form a set of memory regions 1200 in which to store/update the data for array 400.

Referring now to FIG. 11, the processing of the first block 402 starts at step 1102. Then, at step 1104, it is determined whether data for the first block 402 needs to be read in from the memory region 514 allocated for first block 402.

In this regard, when the data for the first block 402 is initially being generated, the data for the first block 402 does not rely on previous data for the block 402, so there is no need to read in previous data for the block 402 from the memory region 514 allocated for that block 402.

In this case, the method proceeds in a conventional manner. In particular, at step 1106, the write address is set to the start of the memory region 514. Then, at step 1108, data for the block 402 is generated (and compressed, if desired), and the data is written out staring at the set address. The initial processing of the block 402 for the frame then finishes at step 1110. Similar steps are also performed in respect of each of the other blocks 406, 408, 410 of the array 400.

FIG. 12 shows the initial state State0 for the body buffer 512 at this point. As is shown in FIG. 12, the data for the first block 402 is stored in memory region 514, the data for the second block 406 is stored in memory region 514, the data for the third block 408 is stored in memory region 516, and the data for the fourth block 410 is stored in memory region 518. At this point, the two free memory regions 522, 524 either store no data or store data that is invalid.

Referring again to FIG. 11, for the next frame, the processing of the first block 402 again starts at step 1102. Then, at step 1104, it is again determined whether data for the first block 402 needs to be read in from the memory region 514 allocated for the first block 402.

In this regard, when the data for the first block 402 is to be updated based on data for the first block 402 from the previous frame, the method proceeds, at step 1112, by setting the write address to the start of the next free allocated memory region for the array 400, rather than the start of the memory region 514. In this case, the next free allocated memory region is memory region 522.

Then, at step 1114, data for a first group of data elements is read in from the current memory region 514 and cached. Then, at step 1116, the data for the first group is updated. Then, at step 1118, the updated data for the first group is written back staring at the set address, i.e. the start of new memory region 522 rather than the start of the current memory region 514.

It is then determined at step 1120 whether there are more groups of data elements in the block 402 to update. When there are more groups in the block 402 to update then, at step 1122, the write address is set to the end of updated data of the first group of data elements. Then, at step 1124, data for a second group of data elements is read in from the current memory region 514 and cached. Then, returning to step 1116 again, the data for the second group is updated. Then, at step 1118 again, the updated data for the second group is written back to the new memory region 522 staring at the set address, i.e. starting at the end of updated data of the first group. It is again determined at step 1120 whether there are more groups in the block 402 to update. When there are no more groups in the block 402 to update then, at step 1126, the current memory region 514 for the block 402 is marked as free for reuse, i.e. free for reallocating to another one of the blocks 406, 408, 410 of the array 400. Then, at step 1110, the processing of the block 402 for the current frame finishes. Similar steps are also performed in respect of each of the other blocks 406, 408, 410 of the array 400. In this embodiment, since there are two free memory regions, blocks 402 and 406 can be updated in parallel and then blocks 408 and 410 can be updated in parallel.

FIG. 12 shows the fully updated state State1 for the body buffer 512 at this point. As is shown in FIG. 12, the updated data for the first block 402 is now stored in memory region 522, the updated data for the second block 406 is now stored in memory region 524, the updated data for the third block 408 is now stored in memory region 514, and the updated data for the fourth block 410 is now stored in memory region 514. At this point, the two free memory regions are now memory regions 518, 520.

As is shown in FIG. 12, setting the write address to the start of the next free memory region each time a block is to be updated means that the updated data for the block currently being updated will not overwrite the updated data for any block already updated and will not overwrite the data for any block yet to be updated, even if the updated data for the block currently being updated is larger than (e.g. entirely uncompressed or at least less compressed than) the previous data for that block.

As will be appreciated, in embodiments, the methods of FIGS. 7, 9 and 11 can be performed in respect of each block 402, 406, 408, 410 of the array 400 and can be repeated in respect of each frame of a series of plural frames making up the desired output.

In any of the above embodiments, the initial or updated data for the blocks 402, 406, 408, 410 can be used as desired. For example, as discussed above, the data for the blocks 402, 406, 408, 410 may relate to pixel values that are output, e.g. by the display controller 110 for display by the display device 118. Alternatively, the data for the blocks 402, 406, 408, 410 may relate to a texture that is used by the GPU 106 to determine further (e.g. colour) data values.

It can be seen from the above that embodiments of the technology described herein can significantly reduce the amount of memory bandwidth and local cache that needs to be used at any one time when updating data for a block of data elements stored in a memory region. This is achieved in embodiments of the technology described herein by reading in data for a first group of the data elements, updating the data for the first group, and then writing back the updated data to the memory without overwriting data for a second group of the data elements that is yet to be read in. Overwriting may be avoided by writing back the updated data for the first group starting at a selected memory address, for example other than the start address of the memory region in which the data for the block is currently being stored. The data for the second group can therefore be read in, updated and written back to memory separately from the data for the first group.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of updating data for a block of data elements of an array of data elements stored in memory, the data for the block of data elements being stored within the memory in a memory region allocated to the block, the method comprising:
   reading in data for a first group of data elements of the block of data elements from the memory region;
   performing a data processing operation using the data for the first group of data elements to generate updated data for the first group of data elements;
   writing back the updated data for the first group of data elements to the memory starting at a selected memory address such that data for a second group of data elements of the block of data elements that is yet to be read in from the memory region is not overwritten by the updated data for the first group of data elements being written back to the memory;
   reading in the data for the second group of data elements from the memory region;
   performing a data processing operation using the data for the second group of data elements to generate updated data for the second group of data elements; and
   writing back the updated data for the second group of data elements to the memory without overwriting the updated data for the first group of data elements;
   wherein the order in which the respective data sets for the first and second groups of data elements are read in from the memory region for processing alternates for successive data updates of the sequence of data updates between being the same as the order in which the respective data sets for the first and second groups of data elements are arranged in the memory region from the start of the memory region and being the reverse of the order in which the respective data sets for the first and second groups of data elements are arranged in the memory region from the start of the memory region.

2. A method as claimed in claim 1, wherein the memory region has a fixed data size that is substantially equal to the data size that the data for the block can have when unencoded.

3. A method as claimed in claim 1, wherein the data for the first and second groups of data elements read in from the memory region comprises encoded data and the updated data for the first and second groups of data elements written back to the memory comprises encoded or unencoded data.

4. A method as claimed in claim 1, wherein writing back the updated data for a group of data elements to the memory comprises writing back the updated data up to the end of the memory region and, when the end of the memory region is reached, returning to the start address of the memory region and continuing to write the updated data from there onwards.

5. A method as claimed in claim 1, wherein the data for the first and second groups of data elements read in from the memory region comprises encoded data, the updated data for the first group of data elements written back to the memory comprises encoded or unencoded data, and the updated data for the second group of data elements written back to the memory comprises unencoded data.

6. A method as claimed in claim 1, wherein the memory region comprises first and second memory portions of fixed data size allocated respectively to the first and second groups of data elements, and wherein writing back the updated data for the first and second groups of data elements to the memory comprises writing back the updated data for the first and second groups of data elements to the first and second memory portions respectively.

7. A method as claimed in claim 1, wherein writing back the updated data for the first and second groups of data elements to the memory comprises writing back the updated data to the same memory region as the memory region from which the data for the first and second groups of data elements was read in.

8. A method as claimed in claim 1, wherein writing back the updated data for the first and second groups of data elements to memory comprises writing back the updated data to a different memory region allocated to the block to the memory region from which the data for the first and second groups of data elements was read in.

9. A data processing apparatus for updating data for a block of data elements of an array of data elements stored in a memory, the data for the block of data elements being stored within the memory in a memory region allocated to the block, the data processing apparatus comprising:
   read processing circuitry configured to read in data for a first group of data elements of the block of data elements from the memory region;
   data processing circuitry configured to perform a data processing operation using the data for the first group of data elements to generate updated data for the first group of data elements; and
   write processing circuitry configured to write back the updated data for the first group of data elements to the memory starting at a selected memory address such that data for a second group of data elements of the block of data elements that is yet to be read in from the memory region is not overwritten by the updated data for the first group of data elements being written back to the memory;
   the read processing circuitry being further configured to read in the data for the second group of data elements from the memory region;
   the data processing circuitry being further configured to perform a data processing operation using the data for the second group of data elements to generate updated data for the second group of data elements; and
   the write processing circuitry being further configured to write back the updated data for the second group of data elements to the memory without overwriting the updated data for the first group of data elements;
   wherein the order in which the respective data sets for the first and second groups of data elements are read in from the memory region for processing alternates for successive data updates of the sequence of data updates between being the same as the order in which the respective data sets for the first and second groups of data elements are arranged in the memory region from the start of the memory region and being the reverse of the order in which the respective data sets for the first and second groups of data elements are arranged in the memory region from the start of the memory region.

10. An apparatus as claimed in claim 9, wherein the memory region has a fixed data size that is substantially equal to the data size that the data for the block can have when unencoded.

11. An apparatus as claimed in claim 9, wherein the data for the first and second groups of data elements read in from the memory region comprises encoded data, the updated data for the first group of data elements written back to the memory comprises encoded or unencoded data, and the updated data for the second group of data elements written back to the memory comprises encoded or uncoded data.

12. An apparatus as claimed in claim 9, wherein the write processing circuitry is configured to, when writing back the updated data for a group of data elements to the memory, write back the updated data up to the end of the memory region and, when the end of the memory region is reached, return to the start address of the memory region and continue to write the updated data from there onwards.

13. An apparatus as claimed in claim 9, wherein the memory region comprises first and second memory portions of fixed data size allocated respectively to the first and second groups of data elements, and wherein the write processing circuitry is configured to, when writing back the updated data for the first and second groups of data elements to the memory, write back the updated data for the first and second groups of data elements to the first and second memory portions respectively.

14. An apparatus as claimed in claim 9, wherein the write processing circuitry is configured to, when writing back the updated data for the first and second groups of data elements to memory, write back the updated data to the same memory region as the memory region from which the data for the first and second groups of data elements was read in.

15. An apparatus as claimed in claim 9, wherein the write processing circuitry is configured to, when writing back the updated data for the first and second groups of data elements to the memory, write back the updated data to a different memory region allocated to the block to the memory region from which the data for the first and second groups of data elements was read in.

16. A non-transitory computer readable storage medium storing computer software code which when executing on a processor of a data processing apparatus performs a method of updating data for a block of data elements of an array of data elements stored in memory, the data for the block of data elements being stored within the memory in a memory region allocated to the block, the method comprising:
  reading in data for a first group of data elements of the block of data elements from the memory region;
  performing a data processing operation using the data for the first group of data elements to generate updated data for the first group of data elements;
  writing back the updated data for the first group of data elements to the memory starting at a selected memory address such that data for a second group of data elements of the block of data elements that is yet to be read in from the memory region is not overwritten by the updated data for the first group of data elements being written back to the memory;
  reading in the data for the second group of data elements from the memory region;
  performing a data processing operation using the data for the second group of data elements to generate updated data for the second group of data elements; and
  writing back the updated data for the second group of data elements to the memory without overwriting the updated data for the first group of data elements;
  wherein the order in which the respective data sets for the first and second groups of data elements are read in from the memory region for processing alternates for successive data updates of the sequence of data updates between being the same as the order in which the respective data sets for the first and second groups of data elements are arranged in the memory region from the start of the memory region and being the reverse of the order in which the respective data sets for the first and second groups of data elements are arranged in the memory region from the start of the memory region.

* * * * *